(12) United States Patent
Mori

(10) Patent No.: US 9,677,664 B2
(45) Date of Patent: Jun. 13, 2017

(54) VEHICLE DIFFERENTIAL DEVICE

(71) Applicant: MUSASHI SEIMITSU INDUSTRY CO., LTD., Toyohashi-shi, Aichi (JP)

(72) Inventor: Hiroyuki Mori, Toyohashi (JP)

(73) Assignee: Musashi Semitsu Industry Co., Ltd., Aichi (JP)

( * ) Notice: Subject to any disclaimer, the term of this patent is extended or adjusted under 35 U.S.C. 154(b) by 0 days.

(21) Appl. No.: 15/085,296

(22) Filed: Mar. 30, 2016

(65) Prior Publication Data

US 2016/0290487 A1 Oct. 6, 2016

(30) Foreign Application Priority Data

Mar. 31, 2015 (JP) .................................. 2015-071294
Nov. 26, 2015 (JP) .................................. 2015-231149

(51) Int. Cl.

| F16H 48/40 | (2012.01) |
|---|---|
| F16H 57/04 | (2010.01) |
| F16H 48/08 | (2006.01) |
| F16H 48/10 | (2012.01) |

(52) U.S. Cl.
CPC ......... *F16H 57/0483* (2013.01); *F16H 48/40* (2013.01); *F16H 57/043* (2013.01); *F16H 48/08* (2013.01); *F16H 2048/102* (2013.01)

(58) Field of Classification Search
None
See application file for complete search history.

(56) References Cited

U.S. PATENT DOCUMENTS

2016/0290485 A1* 10/2016 Mori ................... F16H 57/0483

* cited by examiner

*Primary Examiner* — Dirk Wright
(74) *Attorney, Agent, or Firm* — Carrier Blackman & Associates, P.C.; Joseph P. Carrier; William D. Blackman

(57) ABSTRACT

Differential case includes multiple oil intake holes being respectively at positions offset from intermediate point between two pinions adjacent peripherally in the case toward the pinions, the holes passing through outer peripheral wall of the case in inside-outside direction and being capable of taking lubricant oil into the case. The holes are formed such that as seen in projection plane orthogonal to rotation axis of the case, axes of the holes extending from inner to outer opening ends of the holes are inclined forward in rotational direction of the case when vehicle travels forward. As seen in the projection plane, the pinions are placed outside areas between first and second imaginary lines, the first imaginary lines joining the axis and one peripheral ends of the inner opening ends, the second imaginary lines joining the axis and the other peripheral ends thereof.

10 Claims, 14 Drawing Sheets

VEHICLE DIFFERENTIAL DEVICE

BACKGROUND OF THE INVENTION

Field of the Invention

The present invention relates to a differential device, particularly a vehicle differential device which distributively transmits rotational force to a pair of output shafts, the rotational force being transmitted from a vehicle-installed power source to a differential case, the differential case being housed in a transmission case.

Description of the Related Art

Conventionally, as the above-mentioned kind of differential device, Japanese Patent No. 3915719, for example, has made known a differential device including a plurality of oil intake holes which are formed in an outer peripheral wall of the differential case at intervals in its peripheral direction so as to pass through the outer peripheral wall in an inside-outside direction and take lubricant oil into the differential case.

Although, however, the differential device of Japanese Patent No. 3915719 is designed with consideration of positions and orientations of the plurality of oil intake holes provided to the outer peripheral wall of the differential case, the design is only intended to efficiently scrape up or scoop up the lubricant oil held in a bottom portion of a transmission case into the differential case. The differential device of Japanese Patent No. 3915719 is designed without specific consideration of the taking of the lubricant oil in the transmission case into rotation sliding portions between pinions (differential gears) and a pinion shaft (differential gear support portion).

SUMMARY OF THE INVENTION

The present invention has been made with the foregoing situation taken into consideration. An object of the present invention is to provide a vehicle differential device which is capable of efficiently taking lubricant oil in a transmission case into a differential case, particularly to rotation sliding portions between pinions (differential gears) and a pinion shaft (differential gear support portion), using a simple structure.

In order to achieve the object, a vehicle differential device according to the present invention, distributively transmits rotational force to a pair of output shafts, the rotational force being transmitted from a vehicle-installed power source to a differential case, the differential case being housed in a transmission case, comprising: pinions placed in the differential case; a pinion shaft placed to pass through a rotation axis of the differential case, supported in the differential case and penetrating through and rotatably supporting the pinions; and a pair of side gears which are in mesh with the pinions inside the differential case and connected respectively to the pair of output shafts, wherein the differential case includes a plurality of oil intake holes respectively at positions offset toward the pinions from an intermediate point between two of the pinions positioned adjacent in a peripheral direction of the differential case, the oil intake holes passing through an outer peripheral wall of the differential case in an inside-outside direction and being capable of taking lubricant oil in the transmission case into the differential case, the oil intake holes are formed such that as seen in a projection plane orthogonal to the rotation axis, axes of the oil intake holes extending from inner opening ends to outer opening ends of the oil intake holes are inclined forward in a rotational direction of the differential case in forward traveling of a vehicle, and as seen in the projection plane, the pinions are placed outside areas interposed between first imaginary lines and second imaginary lines, the first imaginary lines joining the rotation axis and one ends in a peripheral direction of the inner opening ends of the oil intake holes, the second imaginary lines joining the rotation axis and the other ends in the peripheral direction of the inner opening ends of the oil intake holes. (This is a first characteristic of the present invention.)

According to the first characteristic, the plurality of oil intake holes capable of taking the lubricant oil in the transmission case into the differential case are arranged in the outer peripheral wall of the differential case so as to be offset toward the pinions from the intermediate point between the two pinions positioned adjacent in the peripheral direction of the differential case; the oil intake holes are formed such that as seen in the projection plane orthogonal to the rotation axis of the differential case, the axes of the oil intake holes extending from the inner opening ends to the outer opening ends of the oil intake holes are inclined forward in the rotational direction of the differential case in forward traveling of the vehicle; and as seen in the projection plane, the pinions are placed outside the areas interposed between the first imaginary lines and the second imaginary lines, the first imaginary lines joining the rotation axis of the differential case and the one ends in the peripheral direction of the inner opening ends of the oil intake holes, the second imaginary lines joining the rotation axis of the differential case and the other ends in the peripheral direction of the inner opening ends of the oil intake holes. Thus, the lubricant oil in the transmission case can be efficiently taken into the differential case via the plurality of oil intake holes. Furthermore, among the plurality of oil intake holes, particularly the oil intake holes which are arranged in front of the pinions in the rotational direction and offset from the intermediate points toward the pinions are capable of efficiently supplying the lubricant oil which is taken into the differential case, to the meshing portions of the pinions and the side gears near the oil intake holes. Meanwhile, the other oil intake holes which are arranged in the back of the pinions in the rotational direction and offset from the intermediate points toward the pinions are capable of supplying the lubricant oil, which is taken into the differential case, to an outer peripheral portion of the pinion shaft near a rotation center of the differential case without the pinions hindering the supply of the lubricant oil (that is, without the pinions working as obstacles which block lubricant oil passages). The supplied lubricant oil flows, due to centrifugal force, along the outer peripheral surface of the pinion shaft toward the outer ends of the pinion shaft, that is, toward rotation sliding portions between the pinions and the pinion shaft. Thereby, the lubricant oil can be efficiently supplied also to the rotation sliding portions. As a result of these, the lubricant oil in the transmission case is efficiently supplied to not only the meshing portions of the pinions which are in mesh with the side gears, but also the rotation sliding portions between the pinions and the pinion shaft. Thereby, an overall lubricating effect can be enhanced.

In the vehicle differential device according to the present invention, preferably, the side gears include: shaft portions connected respectively to the pair of output shafts; the gear portions separating outward from the shaft portions in the radial direction; and intermediate wall portions each having a flat shape and extending outward from inner end portions of the shaft portions in the radial direction. (This is a second characteristic of the present invention.)

According to the second characteristic, the side gears include: the shaft portions connected respectively to the pair of output shafts; the gear portions separating outward from the shaft portions in the radial direction; and the intermediate wall portions each having a plate shape and extending outward from the inner end portions of the shaft portions in the radial direction. Thus, a diameter of each side gear relative to a diameter of each pinion can be made as large as possible, so that the number of teeth of the side gear can be set sufficiently larger than the number of teeth of the pinion. This makes it possible to reduce load burden on the pinion shaft, and thus to decrease the diameter of the pinion shaft. This can accordingly contribute to a reduction in width of the differential case in the axial direction of the output shafts. Furthermore, even if as seen in the projection plane, the oil intake holes are located at the positions offset toward the pinions, the pinions are located outside the areas, that is, the diameter of each pinion is made sufficiently smaller than the diameter of each side gear. Thereby, although as described above, the oil intake holes are arranged to be offset toward the pinions (that is, closer to the pinions) in the peripheral direction of the differential case, the pinions can be arranged outside the areas corresponding to the inner opening ends of the oil intake holes without difficulties. This makes it possible to secure a sufficient effect of lubricating the rotation sliding portions between the pinions and the pinion shaft.

In addition, in order to achieve the object, a vehicle differential device according to the present invention, distributively transmits rotational force to a pair of output shafts, the rotational force being transmitted from a vehicle-installed power source to a differential case, the differential case being housed in a transmission case, comprising: differential gears placed in the differential case; a differential gear support portion placed to pass through a rotation axis of the differential case, supported in the differential case and rotatably supporting the differential gears; a pair of output gears which are in mesh with the differential gears inside the differential case and connected respectively to the pair of output shafts, wherein the differential case includes a plurality of oil intake holes respectively at positions offset toward the differential gears from an intermediate point between two of the differential gears positioned adjacent in a peripheral direction of the differential case, the oil intake holes passing through an outer peripheral wall of the differential case in an inside-outside direction and being capable of taking lubricant oil in the transmission case into the differential case, the oil intake holes are formed such that as seen in a projection plane orthogonal to the rotation axis, axes of the oil intake holes extending from inner opening ends to outer opening ends of the oil intake holes are inclined forward in a rotational direction of the differential case in forward traveling of a vehicle, and as seen in the projection plane, the differential gears are placed outside areas interposed between first imaginary lines and second imaginary lines, the first imaginary lines joining the rotation axis and one ends in a peripheral direction of the inner opening ends of the oil intake holes, the second imaginary lines joining the rotation axis and the other ends in the peripheral direction of the inner opening ends of the oil intake holes, wherein $$d2/PCD \leq 3.36 \cdot \left(\frac{1}{z1}\right)^{\frac{2}{3}} \cdot \sin\left(\tan^{-1}\frac{z1}{z2}\right)$$

is satisfied, and $Z1/Z2>2$ is satisfied, where Z1, Z2, d2 and PCD denote the number of teeth of each of the output gears, the number of teeth of the differential gear, a diameter of the differential gear support portion and a pitch cone distance, respectively. (This is a third characteristic of the present invention.)

According to the third characteristic, the lubricant oil in the transmission case can be efficiently taken into the differential case via the plurality of oil intake holes. Furthermore, among the plurality of oil intake holes, particularly the oil intake holes which are arranged in front of the differential gears in the rotational direction of the differential case in forward traveling of the vehicle and are offset from the intermediate points toward the differential gears are capable of efficiently supplying the lubricant oil which is taken into the differential case, to the meshing portions of the differential gears and the output gears near the oil intake holes. Meanwhile, the other oil intake holes which are arranged in the back of the differential gears in the rotational direction and are offset from the intermediate points toward the differential gears are capable of supplying the lubricant oil which is taken into the differential case, to a portion of the differential gear support portion near the rotation center of the differential case without the differential gears hindering the supply of the lubricant oil (that is, without the differential gears working as obstacles which block lubricant oil passages). The supplied lubricant oil flows, due to centrifugal force, along the differential gear support portion toward the outer ends of the differential gear support portion, that is, toward rotation sliding portions between the differential gears and the differential gear support portion. Thereby, the lubricant oil can be efficiently supplied also to the rotation sliding portions. As these results, the lubricant oil in the transmission case is efficiently supplied to not only the meshing portions of the differential gears which are in mesh with the output gears, but also the rotation sliding portions between the differential gears and the differential gear support portion. Thereby, an overall lubricating effect can be enhanced. Moreover, according to the third characteristic, the differential device as a whole can be sufficiently reduced in width in the axial direction of the output shafts while securing the strength (for example, the static torsion load strength) and the maximum amount of torque transmission at approximately the same levels as the conventional differential device. Accordingly, the differential device can be easily incorporated in a transmission system, which is under many layout restrictions around the differential device, with great freedom and no specific difficulties, and is therefore advantageous in reducing the size of the transmission system.

In the vehicle differential device according to the present invention, preferably, $Z1/Z2 \geq 4$ is satisfied. (This is a fourth characteristic of the present invention.)

In the vehicle differential device according to the present invention, preferably, $Z1/Z2 \geq 5.8$ is satisfied. (This is a fifth characteristic of the present invention.)

According to the fourth and fifth characteristics, the differential device can be more sufficiently reduced in width in the axial direction of the output shafts while securing the strength (for example, the static torsion load strength) and the maximum amount of torque transmission at approximately the same levels as the conventional differential device.

In the vehicle differential device according to the present invention, preferably, cross sections of the oil intake holes orthogonal to the axes of the oil intake holes are each formed in a circular shape. (This is a sixth characteristic of the present invention.)

According to the sixth characteristic, the cross sections of the oil intake holes orthogonal to the axes of the oil intake holes are each formed in a circular shape, that is, the cross sections are each formed in a shape which makes it easy to machine the oil intake holes. Thus, even when, for example, forging is employed to form the differential case whereby it is difficult to form the oil intake holes simultaneously, the oil intake holes can be easily machined after forming the differential case. This can contribute to a reduction in manufacturing costs.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be described below based on the attached drawings.

Figure 1:
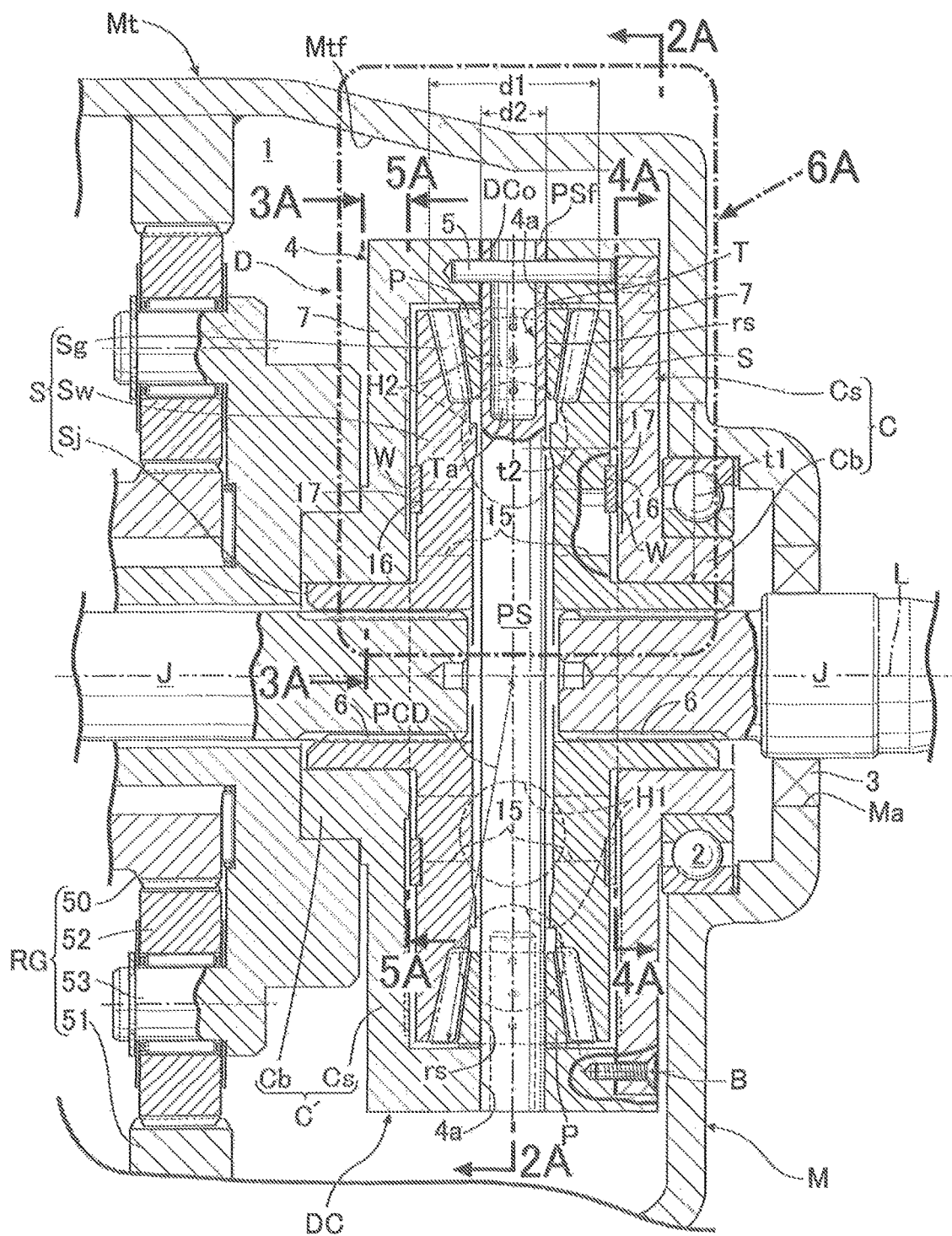
FIG. 1 is a longitudinal sectional view of a main part in a differential device and a speed reduction gear mechanism according to an embodiment of the present invention (a sectional view taken along a 1A-1A line in FIG. 2).

First of all, in FIG. 1, a differential device D is connected to an engine (not illustrated) as a power source mounted on an automobile via a speed reduction gear mechanism RG. The differential device D drives left and right axles while allowing differential rotation between the left and right axles by distributively transmitting to a pair of left and right output shafts J rotational force which is transmitted from the engine to a differential case DC via the speed reduction gear mechanism RG, the pair of left and right output shafts J being continuous respectively to the pair of left and right axles. The differential device D is housed together with the speed reduction gear mechanism RG in, for example, a transmission case M placed beside the engine in a front portion of a vehicle body, in a way that the differential device D is adjacent to the speed reduction gear mechanism RG. Incidentally, a power connection-disconnection mechanism and a forward-rearward travel switching mechanism (both not illustrated) which have been well-known are installed between the engine and the speed reduction gear mechanism RG. In addition, a rotation axis (rotation center) L of the differential case DC coincides with a center axis of the output shafts J.

In the illustrated example, the speed reduction gear mechanism RG is formed from a planetary gear mechanism including: a sun gear 50 which rotates in operative connection with a crankshaft of the engine; a ring gear 51 which concentrically surrounds the sun gear 50 and is fixed to an inner wall of the transmission case M; a plurality of planetary gears 52 which are installed between the sun gear 50 and the ring gear 51 and mesh with them; and a carrier 53 which rotatably and pivotally supports the planetary gears 52. Incidentally, a speed reduction gear mechanism formed from a gear train including multiple spur gears may be used instead of such a planetary gear mechanism.

The carrier 53 is rotatably supported by the transmission case M via a bearing (not illustrated). Furthermore, the carrier 53 is joined to one end portion of the differential case DC of the differential device D so as to rotate integrally with the differential case DC. An other end portion of the differential case DC is rotatably supported in the transmission case M via a bearing 2. A combination body of the differential case DC and the carrier 53 which integrally rotate together is rotatably and stably supported in the transmission case M via the multiple bearings.

In addition, a through-hole Ma to be inserted with each of the output shafts J is formed in the transmission case M. A seal member 3 having an annular shape and sealing an interstice between an inner periphery of the through-hole Ma and an outer periphery of each output shaft J is installed therebetween. Furthermore, an oil pan (not illustrated) which faces an inner space 1 of the transmission case M and holds a predetermined amount of lubricant oil is provided in a bottom portion of the transmission case M. In the inner space 1 of the transmission case M, the lubricant oil held in the oil pan is scraped up and splashed by rotation of movable elements of the speed reduction gear mechanism RG, the differential case DC and the like toward vicinities of rotational parts. This makes it possible to lubricate the mechanical moving parts existing inside and outside the differential case DC. Incidentally, the lubricant oil may be sucked in by an oil pump (not illustrated) to be forcibly splashed or sprayed toward specific parts in the inner space 1 of the transmission case M, for example toward the speed reduction gear mechanism RG and the differential case DC, or toward an inner wall of the transmission case M in peripheries of the speed reduction gear mechanism RG and the differential case DC.

Meanwhile, as being clear from FIG. 1, a ceiling wall Mt of the transmission case M includes an inclined portion descending toward a portion right above the differential case DC. Part of the lubricant oil splashed inside the transmission case M as described above adheres also to the ceiling wall Mt of the transmission case M, subsequently flows toward a lower portion of the ceiling wall Mt along an inclined inner surface Mtf of the ceiling wall Mt, and thereafter drips down from a specific part of the ceiling wall Mt, for example from a terminal part of the inclined inner surface Mtf (that is, a boundary part between the inclined inner surface Mtf and a horizontal surface of the ceiling wall Mt) toward the differential case DC right under the specific part of the ceiling wall Mt. This makes it possible to take part of the dripping lubricant oil into oil intake holes H1, H2 described later which are opened in an outer peripheral surface of the differential case DC. Incidentally, even if the ceiling wall Mt of the transmission case M does not include the above-described inclined portion, the adhering lubricant oil randomly drips down from parts of an inner surface of the ceiling wall Mt due to its own weight because the large amount of lubricant oil is splashed and adheres onto the ceiling wall Mt. Accordingly, part of the lubricant oil can be taken into the oil intake holes H1, H2.

Referring to FIGS. 2 to 6 together, the differential device D includes: the differential case DC; a plurality of pinions (differential gears) P housed in the differential case DC; a pinion shaft (differential gear support portion) PS housed in the differential case DC and rotatably supporting the pinions P; and a pair of left and right side gears (output gears) S housed in the differential case DC, meshing with the pinions P respectively from both the left and right sides and connected respectively to the pair of left and right output shafts J. Furthermore, the differential case DC includes: a case main body 4 having a short cylindrical shape and supporting the pinion shaft PS so as to be able to rotate with the pinion shaft PS; and a pair of left and right cover portions C, C' respectively covering outer sides of the both side gears S and rotating integrally with the case main body 4. The case main body 4 forms an outer peripheral wall of the differential case DC.

The pinion shaft PS is arranged to cross the rotation axis L of the differential case DC inside the differential case DC. Both end portions of the pinion shaft PS are removably inserted into a pair of support through-holes 4a which are provided to the case main body 4 and are arranged on one diameter line of the case main body 4. Furthermore, the pinion shaft PS is fixed to the case main body 4 using a retaining pin 5 which penetrates through the one end portion of the pinion shaft PS and is inserted into the case main body 4. In a state where the pinion shaft PS is fixed to the case main body 4, both outer end surfaces PSf of the pinion shaft PS face the inner space 1 of the transmission case M through openings DCo in the outer peripheral surface of the differential case DC (that is, openings of outer ends of the support through-holes 4a).

The embodiment shows the differential device D which includes two pinions P, and whose pinion shaft PS is formed in a linear rod shape extending along one diameter line of the case main body 4 with the two pinions P respectively supported by both end portions of the pinion shaft PS. Instead, the differential device D may include three or more pinions P. In this case, the pinion shaft PS is formed in a shape of crossing rods such that rods extend radially from a rotation axis L of the differential case DC in three or more directions corresponding to the three or more pinions P (for example, in a shape of a cross when the differential device D includes four pinions P), and tip end portions of the pinion shaft PS support the pinions P, respectively. In addition, the case main body 4 is formed from two dividing elements, and the pinion shafts PS is interposed between the dividing elements.

Moreover, each pinion P may be directly fitted to the pinion shaft PS, as in the illustrated example. Otherwise, the pinion P may be fitted to the pinion shaft PS via bearing means (not illustrated) such as a bearing bush and the like. In the former case, a fitting portion between the pinion shaft PS and the pinion P forms a rotation sliding portion rs between the pinion shaft PS and the pinion P. In the latter case, the above-mentioned bearing means forms the rotation sliding portion rs. Incidentally, as shown in the illustrated example, the pinion shaft PS may be formed in a shape of a shaft whose diameter is substantially equal throughout its whole length, or formed in a shape of a stepped shaft.

Meanwhile, in the embodiment, the pinions P and the side gears S are each formed as a bevel gear. In addition, each pinion P as a whole and each side gear S as a whole, including their tooth portions, are formed by plastic working such as forging and the like. For these reasons, their tooth portions with an arbitrary gear ratio can be precisely formed without restriction in machining work in the case where the tooth portions of the pinions P and the side gears S are formed by cutting work. Incidentally, other types of gears may be used instead of the bevel gear. For example, a face gear may be used for the side gears S, while a spur gear or a helical gear may be used for the pinions P.

In addition, the pair of side gears S each include: a shaft portion Sj to which an inner end portion of the corresponding one of the pair of output shafts J is spline-fitted as at 6 and being formed in a cylindrical shape; a tooth portion (that is, gear portion) Sg situated at a position separated outward from the shaft portion Sj in a radial direction of the differential case DC, being in mesh with the corresponding pinion P and being formed in an annular shape; and an intermediate wall portion Sw formed in a flat ring plate shape orthogonal to the axis L of the corresponding output shaft J and integrally connecting the shaft portion Sj and the tooth portion Sg. Incidentally, in the illustrated example, the shaft portions Sj of the side gears S are directly and rotatably fitted in boss portions Cb of the cover portions C, C', respectively, but may be rotatably fitted in the boss portions Cb of the cover portions C, C' via bearings, respectively.

In the intermediate wall portion Sw of at least one (in the embodiment, each of the two) of the left and right side gears S, penetrating oil passages 15 are formed in the intermediate wall portion Sw so as to cross the intermediate wall portion Sw, both ends of each penetrating oil passage 15 being respectively opened in inner and outer surfaces of the intermediate wall portion Sw.

In addition, the intermediate wall portion Sw of the side gear S is formed with its width t1 in the radial direction larger than a maximum diameter d1 of the pinion P, and with its maximum thickness t2 in an axial direction of the output shaft J smaller than an effective diameter d2, that is, an outer diameter, of the pinion shaft PS (see FIG. 1). Thereby, as described later, a diameter of the side gear S can be made large enough to set the number Z1 of teeth of the side gear S sufficiently larger than the number Z2 of teeth of the pinions P, and the side gear S can be sufficiently thinned in the axial direction of the output shaft J.

One of the pair of left and right cover portions C, C' in the differential case DC, for example, the cover portion C which is on an opposite side to the speed reduction gear mechanism RG is formed separately from the case main body 4 and detachably joined to the case main body 4 using bolts B. Various joining means other than the screwing means, for example, welding means and caulking means may be also used to join the cover portion C to the case main body 4. Moreover, in the illustrated example, the other cover portion C' is integrally formed in the case main body 4 and joined to the carrier 53 of the speed reduction gear mechanism RG. However, like the cover portion C, the other cover portion C' may be formed separately from the case main body 4 and joined to the case main body 4 using the bolts B or other joining means.

Besides, each of the cover portions C, C' includes: a boss portion Cb which concentrically surrounds the shaft portion Sj of the side gear S, in which the shaft portion Sj is rotatably fitted and supported and being formed in a cylindrical shape; and a side wall portion Cs having an outer side surface which is a flat surface orthogonal to the rotation axis L of the differential case DC, the side wall portion Cs being integrally connected to an inner end in an axial direction of the boss portion Cb and being formed in a plate shape. The side wall portions Cs of the cover portions C, C' are arranged within a width of the case main body 4 in an axial direction of the output shafts J. This inhibits the side wall portions Cs of the cover portions C, C' from protruding outward from end surfaces of the case main body 4 in the axial direction, and therefore it is advantageous for a reduction in the width of the differential device D in the axial direction of the output shafts J.

Besides, back surfaces of at least one of the intermediate wall portions Sw and the tooth portions Sg (in the illustrated example, the intermediate wall portions Sw) of the side gears S are rotatably supported on inner side surfaces of the side wall portions Cs of the cover portions C, C' via washers W. Incidentally, the back surfaces of the side gears S may be directly and rotatably supported on the inner side surfaces of the side wall portions Cs by omitting such washers W.

In addition, each side gear S of the embodiment includes the intermediate wall portion Sw having a flat ring plate shape and integrally connecting between the shaft portion Sj on an inner peripheral side of the side gear S and the tooth portion Sg on an outer peripheral side of the side gear S, the tooth portion Sg being separated outward from the shaft portion Sj in a radial direction of the side gear S. The width t1 in the radial direction of the intermediate wall portion Sw is larger than the maximum diameter d1 of each pinion P. For these reasons, the diameter of each side gear S can be made sufficiently larger than the diameter of the pinion P, so that the number Z1 of teeth of the side gear S can be made sufficiently larger than the number Z2 of teeth of the pinion P. This makes it possible to reduce load burden on the pinion shaft PS in torque transmission from the pinions P to the side gears S, and thus to decrease the effective diameter d2 of the pinion shaft PS, and accordingly to decrease a width (diameter) of each pinion P in the axial direction of the output shafts J.

In addition, since the load burden to the pinion shaft PS is reduced as describe above, since reaction force applied to each side gear S decreases and since the back surface of the intermediate wall portion Sw of the side gear S is supported by the corresponding side wall portion Cs of each of the cover portions C, C', it is easy to secure the rigidity strength needed for the side gear S even though the intermediate wall portion Sw is thinned. That is, it is possible to sufficiently thin the intermediate wall portion Sw of the side gear S while securing the support rigidity with respect to the side gear S. Moreover, in the embodiment, since the maximum thickness t2 of the intermediate wall portion Sw of the side gear S is formed much smaller than the effective diameter d2 of the pinion shaft PS whose diameter can be made smaller, the further thinning of the intermediate wall portion Sw of the side gear S can be achieved. Besides, since the side wall portion Cs of each of the cover portions C, C' is formed in a plate shape such that the outer side surface thereof is the flat surface orthogonal to the rotation axis L of the differential case DC, the thinning of the side wall portion Cs itself can be achieved.

As a result of these, the width of the differential device D as a whole can be sufficiently decreased in the axial direction of the output shafts J while securing as approximately the same strength (for example, static torsion load strength) and as approximately the same amount of maximum torque transmission compared with the conventional differential device. This makes it possible to easily incorporate the differential device D, with great freedom and without trouble, even when a transmission system imposes many restrictions on the layout of the vicinity of the differential device D, and is extremely advantageous in reducing the size of the transmission system.

Figure 2:
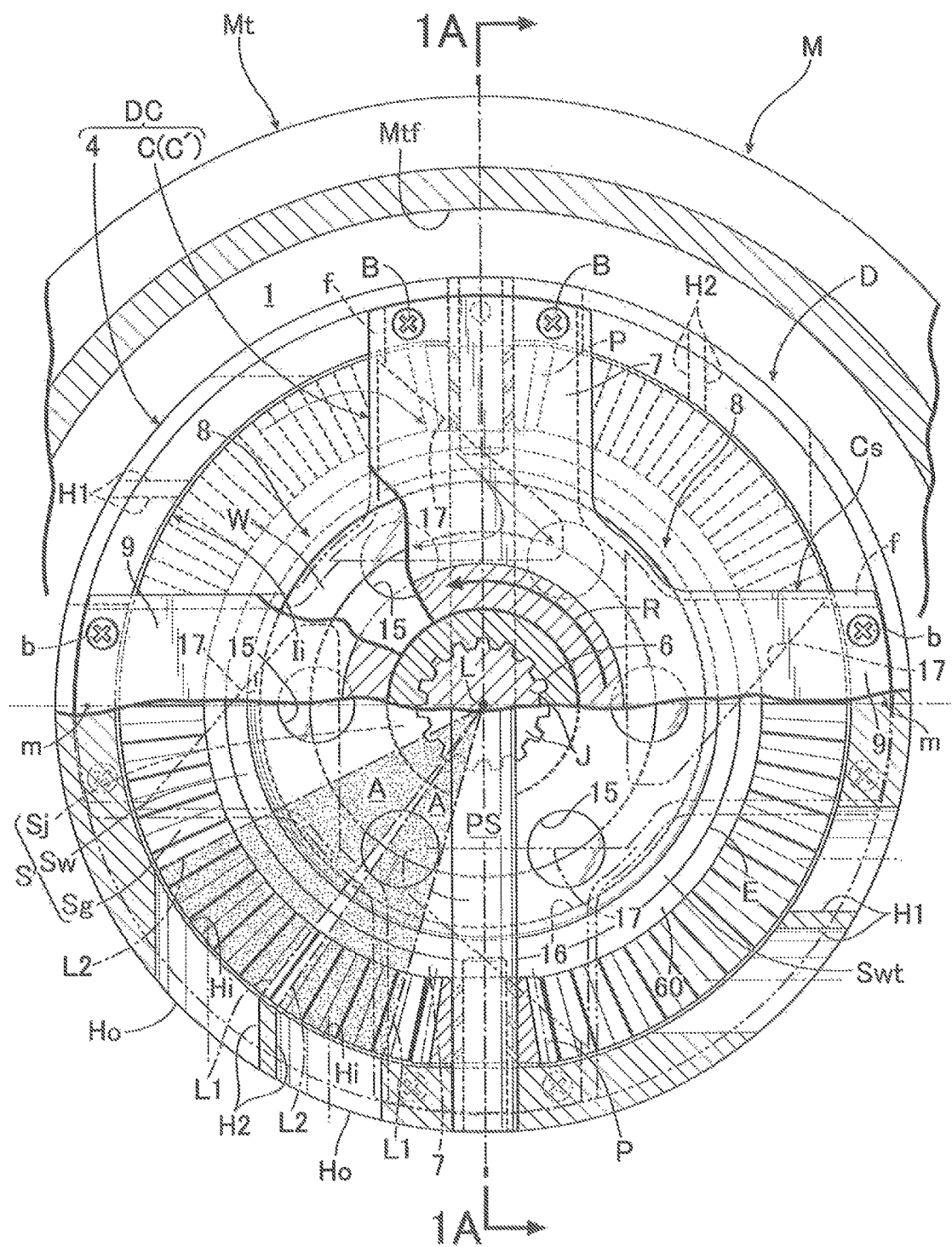
FIG. 2 is a partially cutaway side view on one side in an axial direction of the differential device (a sectional view taken along a 2A-2A line in FIG. 1).

Meanwhile, the side wall portion Cs of the one cover portion C has a structure having oil retaining portions 7 covering parts of a back surface of the side gear S in first predetermined areas including areas which overlap the pinions P as seen in a side view from outside in the axial direction of the output shaft J (i.e., as seen in FIG. 2), having lightening portions 8 exposing parts of the back surface of the side gear S to the outside of the differential case DC in second predetermined areas which do not overlap the pinions P as seen in the side view and having connecting arm portions 9 being separated from the oil retaining portions 7 in the peripheral direction of the case main body 4, extending in the radial direction of the case main body 4 and connecting between the boss portion Cb and the case main body 4. In other words, the side wall portion Cs basically having a disk shape in the cover portion C has a structural form in which: the plurality of lightening portions 8 each having a cutout shape are formed in the side wall portion Cs at intervals in the peripheral direction; and thereby, one oil retaining portion 7 and one connecting arm portion 9 are formed respectively on opposite sides of the lightening portion 8 in the peripheral direction.

The structural form of the side wall portion Cs of the cover portion C, particularly the oil retaining portions 7, makes it possible for the lubricant oil to easily stay in spaces covered by the oil retaining portions 7 and the case main body 4 and to be easily retained on the pinions P and the vicinities of the pinions P, the lubricant oil tending to move outward in the radial direction due to the centrifugal force produced by the rotation of the differential case DC.

Figure 3:
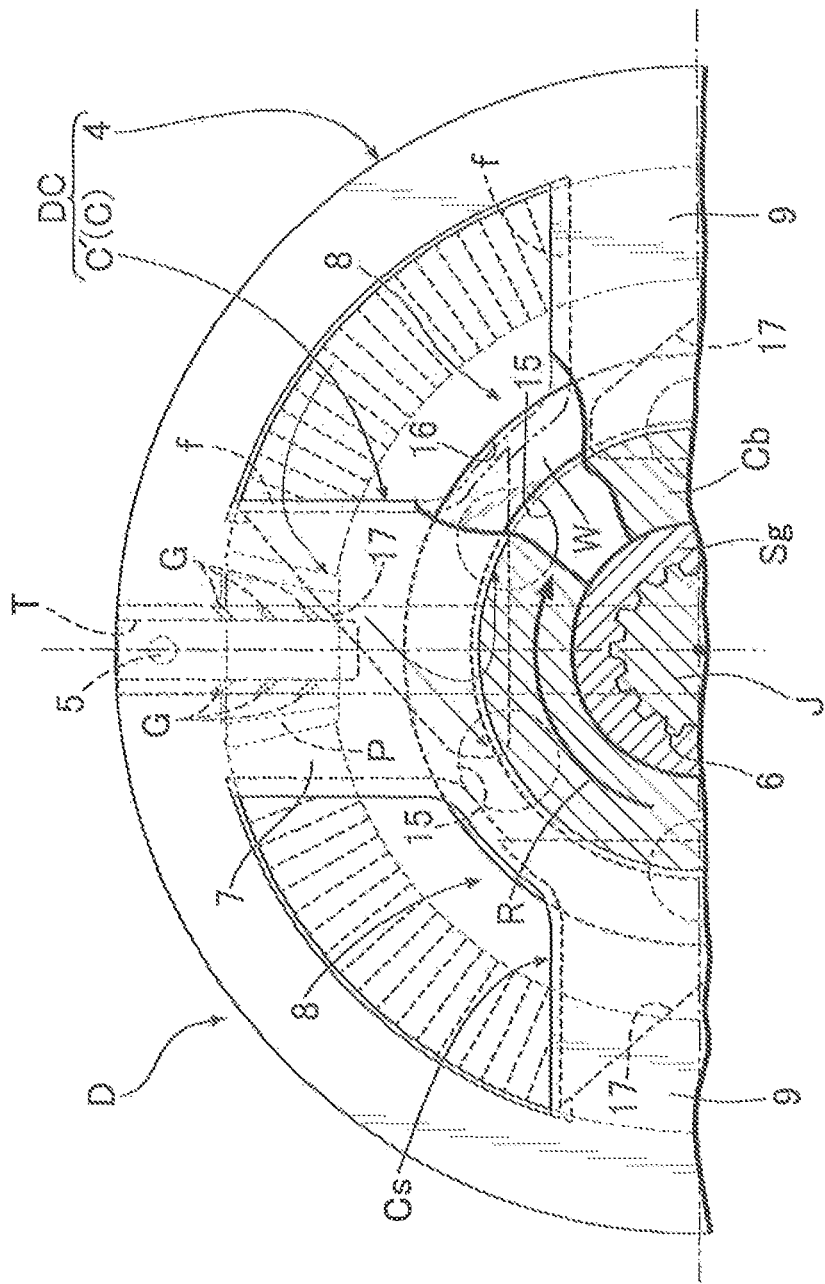
FIG. 3 is a side view of a main part on the other side in the axial direction of the differential device (a sectional view taken along a 3A-3A line in FIG. 1).

Furthermore, as shown in FIG. 3, in this embodiment, the lightening portions 8 are formed in the side wall portion Cs of the other cover portion C', like in the one cover portion C. In the side wall portion Cs of the other cover portion C', however, the oil retaining portions 7 and the connecting arm portions 9 are integrally formed in the case main body 4. Incidentally, the side wall portion Cs of one of the cover portions C, C' may be formed in a disk shape having no lightening portions (accordingly covering the entirety of the back surfaces of the intermediate wall portion Sw and the tooth portion Sg of the corresponding side gear S).

Figure 6A:
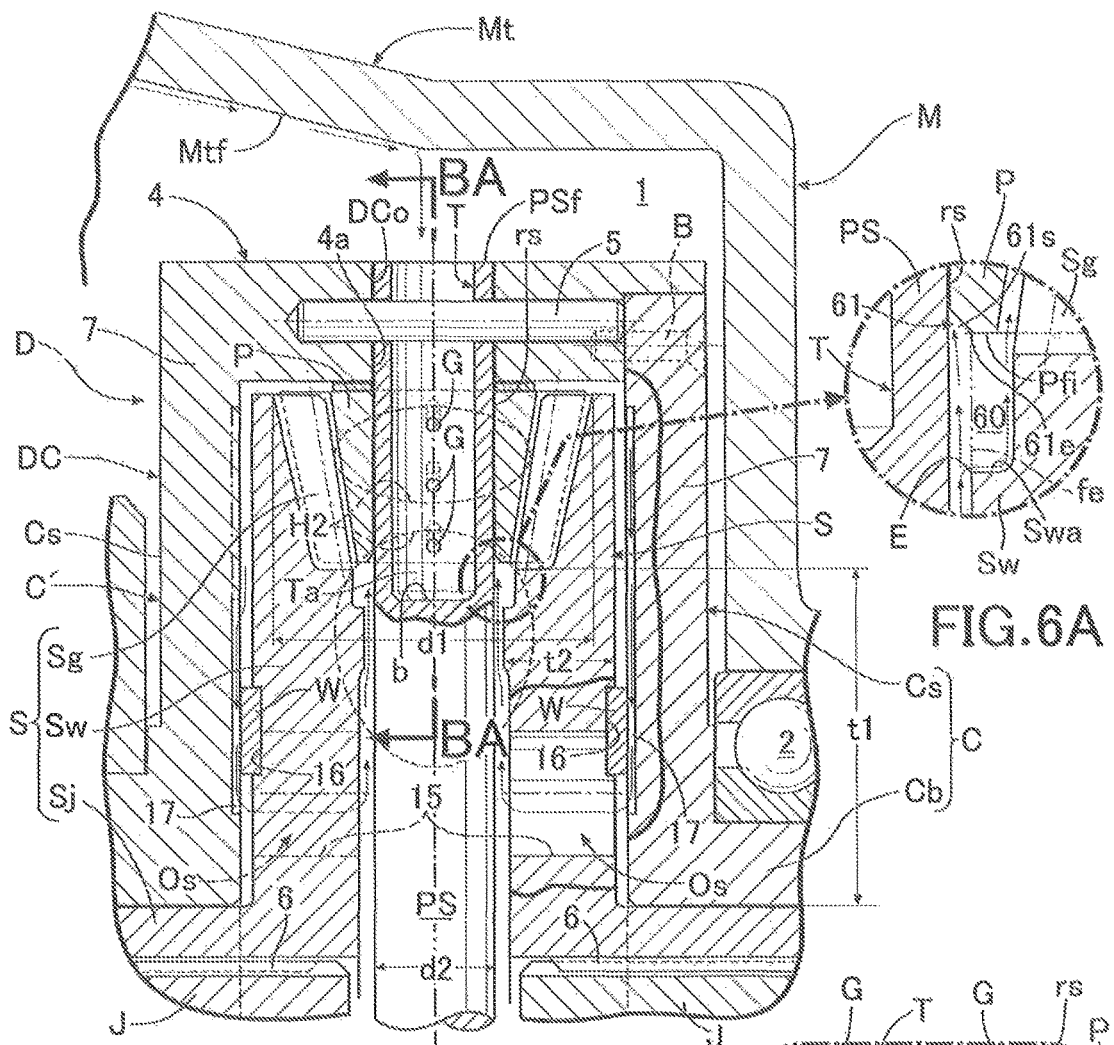
FIG. 6A is an enlarged view of a section indicated with an arrow 6A in FIG. 1
Figure 6B:
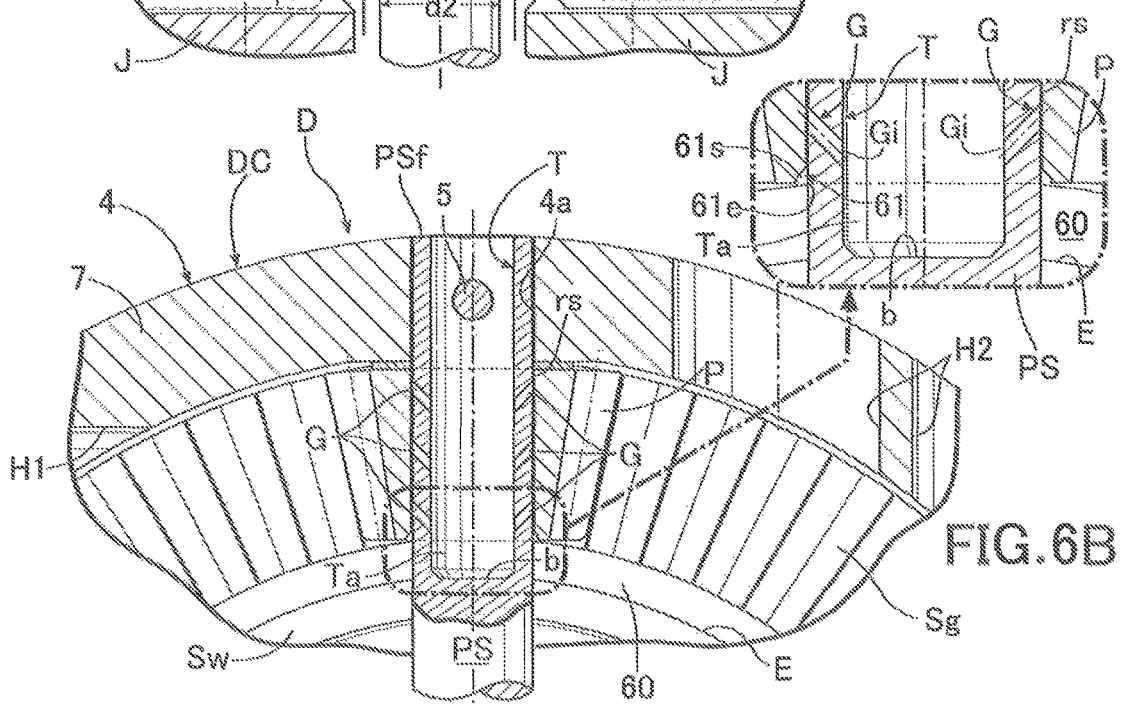
FIG. 6B is a sectional view taken along a BA-BA line in FIG. 6A.

Meanwhile, as clearly shown in FIGS. 6A and 6B, inside the differential case DC, an oil reserving portion 61 is formed a portion where the pinion P and the pinion shaft PS face each other such that the oil reserving portion 61 directly communicates with the fitting portion (that is, the rotation sliding portion rs) between the pinion P and the pinion shaft PS where they are rotationally slidable relative to each other. The oil reserving portion 61 faces a space 60 adjacent to an end surface Pfi of the pinion P on a radially inner side of the side gear S and is capable of catching and holding the lubricant oil splashed in the space 60. In the illustrated example, the oil reserving portion 61 is formed by performing a chamfering on an end edge of an inner peripheral surface of the pinion P on the radially inner side of the side gear S, the chamfering being formed in an annular shape.

Moreover, the step portion E having the edge shape and an annular shape is formed in each of the mutually-facing surfaces of the pair of left and right side gears S (in the illustrated example, the inner side surface of the intermediate wall portion Sw of each side gear S on the tooth portion Sg side), the step portion E being capable of guiding and splashing part of the lubricant oil into the space 60 by separating the part of the lubricant oil from a lubricant oil flow that flows due to centrifugal force in the radially outward direction along the inner side surface of the intermediate wall portion Sw. A top surface of the step portion E is flush with and connected to the inner side surface of the intermediate wall portion Sw which is inward of the step portion E in the radial direction of the side gear S.

Meanwhile, each side gear S can be formed by forging or any other forming method. In a case where, for example, the side gear S is formed by forging, there is likelihood that part of the side gear S between the top surface of the step portion E and an outer peripheral surface (step surface) continuous to the step portion E is rounded due to shear droop. In this case, a sharp edge can be formed between the top surface and the outer peripheral surface (step surface) by machining the outer peripheral surface (step surface).

It should be noted that while the automobile is traveling in a forward direction and the differential case DC is being rotationally driven in a normal rotation direction R, the lubricant oil is efficiently supplied to the vicinity of an intermediate portion in the radial direction of the inner side surface of the intermediate wall portion Sw via the penetrating oil passages 15 in the side gear S, as described later. For this reason, the lubricant oil supplied to the vicinity of the intermediate portion in the radial direction flows due to the centrifugal force in the radially outward direction along the inner side surface of the intermediate wall portion Sw, that is, toward the tooth portion Sg. On the way to the tooth portion Sg, the lubricant oil reaches the step portion E.

Thereafter, the step portion E is capable of guiding and splashing part of the lubricant oil into the space 60 by effectively separating the part of the lubricant oil from the lubricant oil flow that flows due to the centrifugal force in the radially outward direction along the inner side surface of the intermediate wall portion Sw, using the edge portion of the step portion E. Thereby, the splashed lubricant oil can be efficiently caught and held in the oil reserving portion 61 facing the space 60. For this reason, the lubricant oil is sufficiently supplied to the rotation sliding portion rs between the pinion P and the pinion shaft PS via the oil reserving portion 61. Meanwhile, the remaining part of the lubricant oil flows toward the tooth portions Sg of the side gears S along the step surface of the step portion E without being splashed from the edge portion of the step portion E. Accordingly, meshing portions of the tooth portions Sg and the pinion P can be lubricated sufficiently. Thereby, even under severe driving conditions such as high-speed rotation of the pinion P due to a reduction in the diameter of the pinion P, and the like, both the meshing portions and the rotation sliding portion rs between the pinion P and the pinion shaft PS are lubricated sufficiently.

Furthermore, the step portion E having the edge shape of the embodiment is formed in a way that an imaginary plane fe passing through the top surface of the step portion E and orthogonal to the rotation axis L of the differential case DC passes through an inner space $61s$ or an opening edge $61e$ of the oil reserving portion 61. Thereby, the lubricant oil separated by the step portion E from the lubricant oil flow, guided and splashed into the space 60 can be effectively caught in the oil reserving portion 61, and easily held in the oil reserving portion 61. For this reason, the lubricant oil can be more efficiently supplied to the rotation sliding portion rs between the pinion P and the pinion shaft PS. What is more, as described above, the differential device D of the embodiment employs the structure in which the diameter of the side gear S is made sufficiently larger than the diameter of the pinion P in order to reduce the width of the differential case DC in the axial direction of the output shafts J. Accordingly, the increase in the diameter of the side gear S causes larger centrifugal force to be applied to the lubricant oil flow that flows in the radially outward direction along the inner side surface of the intermediate wall portion Sw. This enhances the effect of separating the part of the lubricant oil from the lubricant oil flow and splashing the part of the lubricant oil using the step portion E, and accordingly makes it possible for the splashed lubricant oil to be more effectively caught in the oil reserving portion 61.

Meanwhile, in the embodiment, as described above, the both outer end surfaces PSf of the pinion shaft PS face the inner space 1 of the transmission case M through the respective openings DCo in the outer peripheral surface of the differential case DC (that is, the openings of the outer ends of the support through-holes 4a of the case main body 4). In addition, as shown in FIGS. 6A and 6B, bottomed hollow portions T each having one end opened and the other end closed are formed respectively in the both end portions of the pinion shaft PS so as to be recessed from the both outer end surfaces PSf of the pinion shaft PS. Each bottomed hollow portion (hollow cylindrical portion) T is formed in a bottomed cylindrical hole shape which extends long in an axial direction of the pinion shaft PS. The depth of the hole of the bottomed hollow portion T is set large enough for the hole to pass through the rotation sliding portion rs between the pinion shaft PS and the pinion P and to further extend inward of the differential case DC in the radial direction. Thus, the bottomed hollow portion T employs a placement mode in which at least an intermediate portion of the bottomed hollow portion T is concentrically surrounded by the rotation sliding portion rs.

A plurality of oil guiding holes G capable of guiding the lubricant oil held in the bottomed hollow portion T to the rotation sliding portion rs due to the centrifugal force are provided in a peripheral wall of the bottomed hollow portion T in the pinion shaft PS. Each of the oil guiding holes G is formed to cross the peripheral wall of the bottomed hollow portion T from an inner periphery to an outer periphery of the peripheral wall thereof and be inclined outward in the axial direction of the pinion shaft PS. The plurality of oil guiding holes G are formed to be arranged at intervals in a longitudinal direction of the bottomed hollow portion T. Furthermore, multiple groups each including the thus-arranged oil guiding holes G are arranged at intervals in a peripheral direction of the bottomed hollow portion T, that is, radially from a center axis of the bottomed hollow portion T. Moreover, an opening end Gi of each oil guiding hole G in the inner periphery of the peripheral wall of the bottomed hollow portion T is separated from a bottom surface b of the bottomed hollow portion T in the longitudinal direction of the bottomed hollow portion T. For this reason, a hollow part Ta of the bottomed hollow portion T located between the bottom surface b and the opening end Gi can function as an oil reservoir which is capable of holding a necessary amount of lubricant oil.

Because of this specialized structure of the bottomed hollow portion T in the pinion shaft PS, when the engine stops, the bottomed hollow portion T upwardly oriented during the stop of the engine is capable of holding and retaining the lubricant oil which is splashed in the transmission case M in accordance with the operation of the differential device D and the like before the stop, and the lubricant oil which drips from the ceiling wall Mt of the transmission case M after attaching to the ceiling wall Mt in accordance with the operation of the differential device D and the like before the stop. In addition, when the differential device D starts its operation, the lubricant oil held in the bottomed hollow portion T can be quickly supplied to the rotation sliding portion rs between the pinion P and the pinion shaft PS via the oil guiding holes G due to the centrifugal force. In this case, since the oil guiding holes G extend from the inner periphery to the outer periphery of the peripheral wall of the bottomed hollow portion T while inclined outward in the axial direction of the pinion shaft PS, the lubricant oil held and retained in the bottomed hollow portion T can be effectively inhibited from flowing out while the differential device D stops, and can be efficiently supplied to the rotation sliding portion rs via the oil guiding holes G using the centrifugal force when the differential device D starts its operation.

It should be noted that depending on where the differential device D stops, there is likelihood that: the bottomed hollow portion T is oriented horizontally; and it is accordingly difficult for the lubricant oil to be held in the bottomed hollow portion T. In most cases, however, either of the plurality of bottomed hollow portions T is directed upward by being oriented vertically or inclinedly, and accordingly can hold the lubricant oil having splashed in the transmission case M and the lubricant oil having dripped from the ceiling wall Mt of the transmission case M.

Furthermore, in the embodiment, the plurality of first oil intake holes H1 and the plurality of second oil intake holes H2 are formed in the outer peripheral wall, that is, the case main body 4, of the differential case DC so as to each have a circular shape in the cross section and be arranged at intervals in a peripheral direction of the differential case DC, the first oil intake holes H1 and the second oil intake holes H2 passing through the case main body 4 in the inside-outside direction and being capable of taking the lubricant oil in the transmission case M, for example the lubricant oil dripping from the ceiling wall Mt of the transmission case M, into the differential case DC. Moreover, as clearly shown in FIG. 2, the first and second oil intake holes H1, H2 are placed at their respective positions offset from intermediate points m between the two adjacent pinions P in the peripheral direction of the differential case DC toward the pinions P.

Besides, the oil intake holes H1, H2 are formed such that as seen in a projection plane orthogonal to the rotation axis L of the differential case DC, axes of the oil intake holes H1, H2 from inner opening ends Hi to outer opening ends Ho of the oil intake holes H1, H2 are inclined forward in the rotational direction R of the differential case DC while the vehicle is travelling forward. In addition, as seen in the projection plane, the pinions P are placed outside areas A interposed between first imaginary lines L1 and second imaginary lines L2. In this respect, the first imaginary lines L1 join the rotation axis L and one ends in the peripheral direction of the inner opening ends Hi of the oil intake holes H1, H2, while the second imaginary lines L2 join the rotation axis L and the other ends in the peripheral direction of the inner opening ends Hi of the oil intake holes H1, H2.

In addition, the embodiment employs the thin differential structure in which as described above, the diameter of the pinions P can be made sufficiently smaller than the diameter of the side gears S. For this reason, even if the oil intake holes H1, H2 are arranged to be offset from the intermediate points m toward the pinions P (that is, closer to the pinions P) in the peripheral direction of the differential case DC, the pinions P can be arranged outside the areas A corresponding to the inner opening ends Hi of the oil intake holes H1, H2 without difficulties. In other words, the pinions P are formed with a diameter sufficiently smaller than the diameter of the side gears S such that the pinions P can be arranged outside the areas A without difficulties even if the oil intake holes H1, H2 are arranged to be offset closer to the pinions P.

Because of this specialized oil intake holes H1, H2 in the outer peripheral wall of the differential case DC, while the vehicle is travelling forward and the differential case DC is rotating in the normal rotation direction R at relatively low speed, the lubricant oil dripping from the ceiling wall Mt of the transmission case M can be efficiently taken into the differential case DC via the plurality of first oil intake holes H1 and the plurality of second oil intake holes H2 all inclined in their specific directions (that is, the directions which enable the lubricant oil to be efficiently taken into the differential case DC). Furthermore, among the oil intake holes H1, H2, particularly the first oil intake holes H1 which are arranged at a front side in the normal rotation direction R of the pinions P and offset from the intermediate points m toward the pinions P are capable of efficiently supplying the lubricant oil, which is dripped from the ceiling wall Mt and is taken into the differential case DC, to the meshing portions of the pinions P and the side gears S near the first oil intake holes H1. On the other hand, the second oil intake holes H2 which are arranged at a back side in the normal rotation direction R of the pinions P and offset from the intermediate points m toward the pinions P are capable of supplying the lubricant oil, which is dripped from the ceiling wall Mt and is taken into the differential case DC, to an outer peripheral portion of the pinion shaft PS near the rotation center L of the differential case DC without the pinions P hindering the supply of the lubricant oil (that is, without the pinions P working as obstacles which block the lubricant oil passages). From the outer peripheral portion thereof, the lubricant oil flows along an outer peripheral surface of the pinion shaft PS toward the outer ends of the pinion shaft PS, that is, toward the rotation sliding portions rs between the pinions P and the pinion shaft PS due to the centrifugal force. Thereby, the lubricant oil can be efficiently supplied also to the rotation sliding portions rs. As a result of these, the lubricant oil dripped from the ceiling wall Mt of the transmission case M is efficiently supplied to not only the meshing portions of the pinions P which are in mesh with the side gears S, but also the rotation sliding portions rs between the pinions P and the pinion shaft PS. Thereby, the overall lubricating effect can be enhanced. Incidentally, part of the lubricant oil which is dripped from the ceiling wall Mt and is taken into the differential case DC via the oil intake holes H1, H2 reaches also the inner side surfaces of the intermediate wall portions Sw of the side gears S, and flows due to the centrifugal force in the radially outward direction, that is, toward the tooth portions Sg, along the inner side surfaces of the intermediate wall portions Sw.

Meanwhile, as described above, the washers W are installed between the inner side surfaces of the side wall portions Cs of the cover portions C, C' in the differential case DC and outer side surfaces of the side gears S. For the purpose of positioning and retaining the washers W in appropriate fixed positions in consideration of the lubricant oil passages to the penetrating oil passages 15, washer retaining grooves 16 each having an annular shape are formed in at least one of the inner side surfaces of the side wall portions Cs and the outer side surfaces of the side gears S which mutually face each other (in the illustrated example, the outer side surfaces of the side gears S). The washers W are fitted in the washer retaining grooves 16. In addition, relative positions between the washers W and the penetrating oil passages 15 are set such that inner peripheral portions of the washers W face opening portions of the penetrating oil passages 15 in the outer side surfaces of the intermediate wall portions Sw. Thereby, the washers W inhibit the flow of the lubricant oil which tends to flow in the radially outward direction due to the centrifugal force in a gap between the inner side surfaces of the side wall portions Cs of the cover portions C, C' and the outer side surfaces of the side gears S. Thus, the lubricant oil can be guided from inner peripheries of the washers W to the insides of the side gears S via the penetrating oil passages 15. For this reason, it is possible to increase the amount of lubricant oil which passes through the penetrating oil passages 15, subsequently flows in the radially outward direction along the inner side surfaces of the side gears S and eventually reaches the tooth portions Sg.

Figure 4:
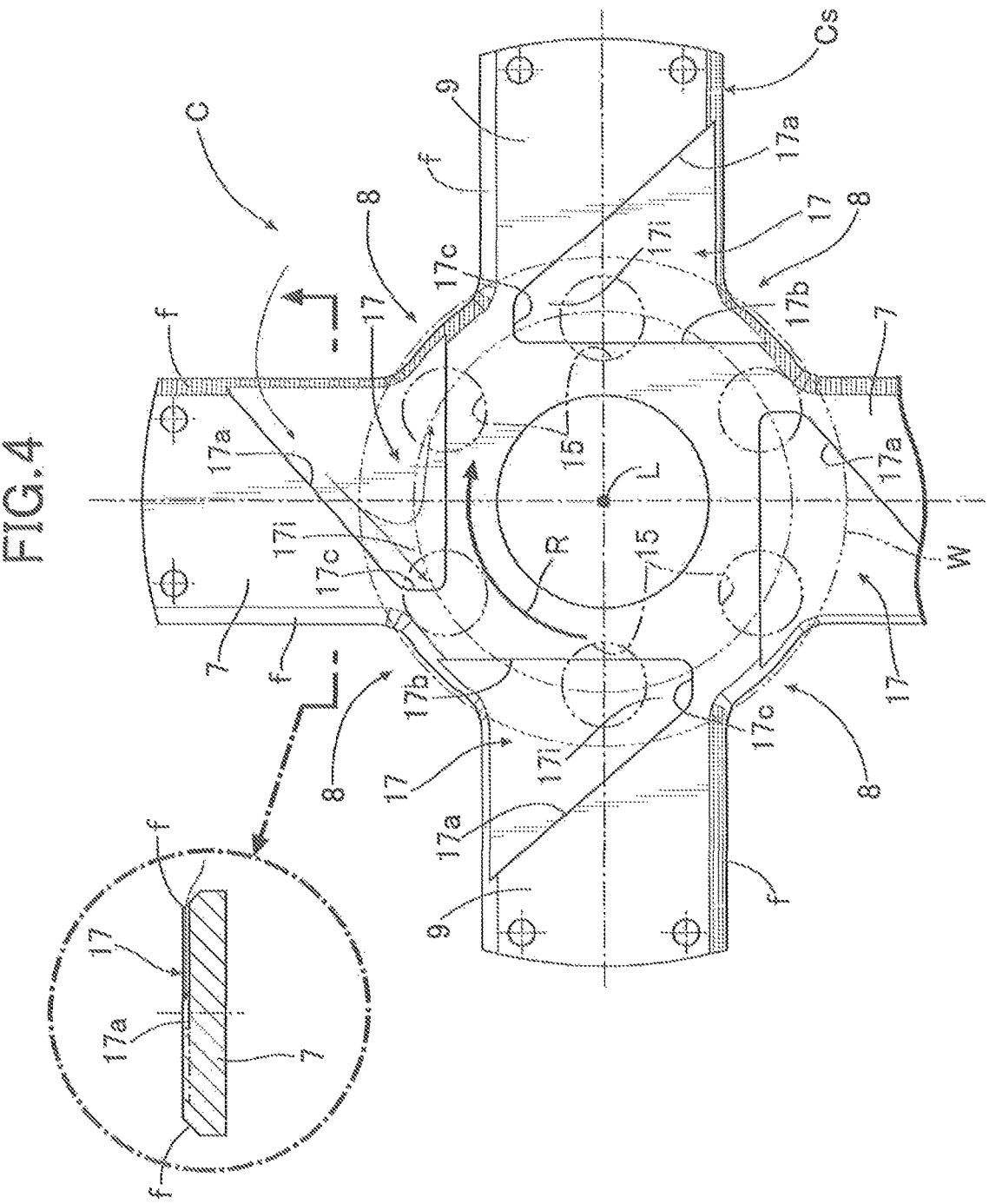
FIG. 4 is a sectional view taken along a 4A-4A line in FIG. 1 and shows only one cover portion C with solid lines.
Figure 5:
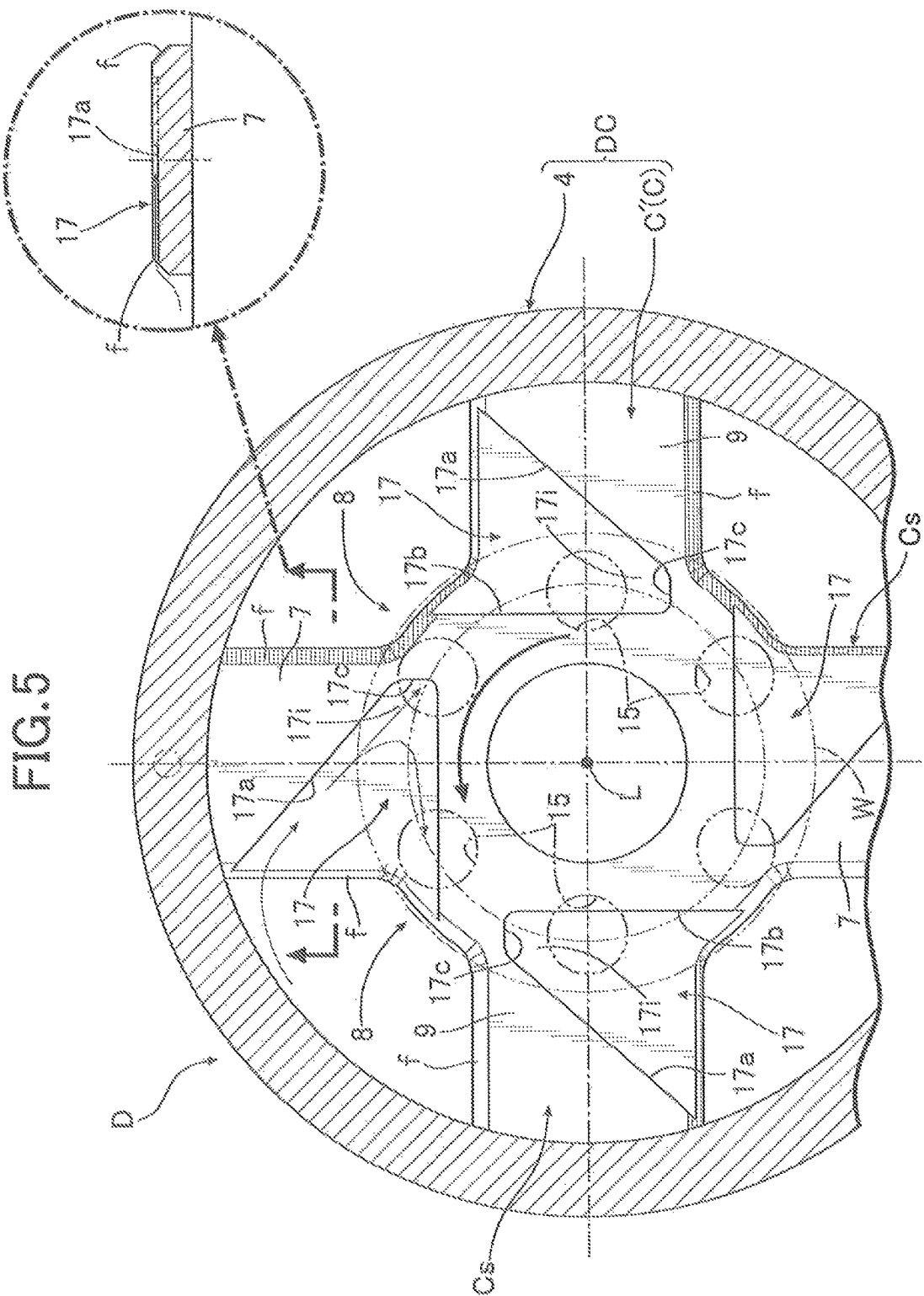
FIG. 5 is a sectional view taken along a 5A-5A line in FIG. 1 and shows only the other cover portion C' and a differential case with solid lines.

Moreover, referring to FIGS. 4 and 5 together, oil guide grooves 17 are provided in a recess shape in the inner side surfaces of the side wall portions Cs of the cover portions C, C', the oil guide grooves 17 being capable of guiding the flow of the lubricant oil into the washers W and the penetrating oil passages 15 from peripheral edges of lightening portions 8 while the differential case DC is in rotation. Each oil guide groove 17 is formed in a substantially triangle shape by including: a first inner side wall 17a obliquely extending with respect to a tangent direction of the corresponding oil retaining portion 7 (more concretely, obliquely extending to the center axis L side as going backward in the normal rotation direction to be described later of the differential case DC) from the peripheral edge of the corresponding lightening portion 8; a second inner side wall 17b extending from the peripheral edge of the lightening portion 8 in the tangent direction of the oil retaining portion 7; and a back wall portion 17c connecting inner ends of the both inner side walls 17a, 17b. Furthermore, as seen in the projection plane orthogonal to the rotation axis L of the differential case DC, an inner back groove portion 17i of the oil guide groove 17 which the back wall portion 17c faces is placed in a position which enables the inner back groove portion 17i to always overlap part of the washer W, and to temporarily overlap the opening portions of the penetrating oil passages 15 in the outer side surface of the intermediate wall portion Sw in accordance with rotation of the differential case DC.

Thus, while the differential case DC is being rotated in the normal rotation direction R by the rotational force which is transmitted from the engine via the speed reduction gear mechanism RG in order to make the automobile travel forward, the lubricant oil splashed around the differential case DC inside the transmission case M flows from the peripheral edges of the lightening portions 8 into the oil retaining portions 7 (that is, the oil guide grooves 17) due to relative speed difference between the lubricant oil and the rotating cover portions C, C'. In this case, the lubricant oil flowing in the oil retaining portions 7 is efficiently collected toward the inner back groove portions 17i which are located in the rearmost positions in the rotational direction in the oil guide grooves 17, particularly due to a guiding effect of the first inner side walls 17a, and is efficiently guided from the inner back groove portions 17i to the washers W and the penetrating oil passages 15. Subsequently, the lubricant oil passes through the penetrating oil passages 15 and reaches the inner side surfaces of the intermediate wall portions Sw of the side gears S. Thereafter, the lubricant oil flows in the radially outward direction along the inner side surfaces of the intermediate wall portions Sw due to the centrifugal force, as described above.

Besides, the cover portions C, C' of the embodiment have an oil guiding inclined surface f in a peripheral edge portion of each lightening portion 8, the oil guiding inclined surface f being capable of guiding flow of the lubricant oil into an inner side of the case main body 4 during the rotation of the differential case DC. In addition, an inlet of each of the oil guide grooves 17 is opened to the oil guiding inclined surface f. As seen in a cross-section crossing the oil retaining portions 7 and the connecting arm portions 9 in the peripheral direction of the differential case DC (see the partial sectional views in FIGS. 4 and 5), the oil guiding inclined surface f is formed so as to be inclined to the respective center sides in the peripheral direction of the oil retaining portion 7 and the connecting arm portion 9, toward their respective inner side surfaces from their respective outer side surfaces. Thus, by oil induction operation of the oil guiding inclined surface f, it is possible for the lubricant oil to smoothly flow from the outer side to the inner side of each of the cover portions C, C' in accordance with rotation of the differential case DC, and particularly to effectively flow into the oil guide groove 17 from the inlet opened to the oil guiding inclined surface f.

Next, descriptions will be provided for an operation of the embodiment described above. In the differential device D of the embodiment, in a case where the differential case DC receives rotational force from a power source (for example, an engine) via a speed reduction gear mechanism RG, when the pinion P revolves around the rotation axis L of the differential case DC together with the differential case DC, without rotating around the pinion shaft PS, the left and right side gears S are rotationally driven at the same speed, and their driving forces are evenly transmitted to the left and right output shafts J. Meanwhile, when a difference in rotational speed occurs between the left and right output shafts J due to turn traveling or the like of the automobile, the pinion P revolves around the rotation axis L of the differential case DC while rotating around the pinion shaft PS. Thereby, the rotational driving force is transmitted from the pinion P to the left and right side gears S while allowing differential rotations. The above is the same as the operation of the conventional differential device.

Meanwhile, in a case where the power of the engine is being transmitted to the left and right output shafts J via the speed reduction gear mechanism RG and the differential device D while the automobile is travelling forward, the lubricant oil is powerfully splashed in various areas inside the transmission case M due to the rotation of the movable elements of the speed reduction gear mechanism RG and the rotation of the differential case DC. As described above, part of the splashed lubricant oil flows into inner sides of the cover portions C, C' via the lightening portions 8.

In this case, as described above, the lubricant oil flowing into the oil guide grooves 17 formed in the inner side surfaces of the side wall portions Cs of the cover portions C, C' is efficiently collected toward the inner back groove portions 17i due to the guiding effect of the first inner side walls 17a, and is efficiently guided from the inner back groove portions 17i to the washers W and the penetrating oil passages 15. For this reason, not only can the effect of lubricating the washers W be enhanced, but also a sufficiently large amount of lubricant oil passing through the penetrating oil passages 15 and reaching the inner side surfaces of the intermediate wall portions Sw of the side gears S can be secured. After reaching there, the lubricant oil flows in the radially outward direction along the inner side surfaces of the intermediate wall portions Sw due to the centrifugal force, as described above. Part of the lubricant oil flow is splashed from the step portions E having the edge shape to the spaces 60, and is caught and held in the oil reserving portions 61. Thereby, the rotation sliding portions rs between the pinion shaft PS and the pinions P are lubricated. On the other hand, the remaining part of the lubricant oil flow flows along the step surfaces of the step portions E, and reaches the tooth portions Sg of the side gears S. Thereby, the meshing portions of the tooth portions Sg and the pinions P can be lubricated. As a result, even in a case where the tooth portions Sg of the side gears S place farther from the output shafts J due to increase in the diameter of the side gears S, or even under severe driving conditions such as the high-speed rotation of the pinions P, the lubricant oil can be efficiently supplied to the meshing portions and the rotation sliding portion rs. Accordingly, the seizure in the meshing portions and the rotation sliding portion rs can be prevented effectively.

Moreover, in the embodiment, the bottomed hollow portions T opened to the inner space 1 of the transmission case M and capable of functioning as the oil reservoir are provided in a recess shape on the outer end surfaces PSf of the pinion shaft PS. For this reason, while the engine stops, an upward-oriented one of the bottomed hollow portions T can hold and retain the lubricant oil which is splashed in the transmission case M in accordance with the operation of the differential device D and the like before the engine stops, and the lubricant oil which is dripped from the ceiling wall Mt of the transmission case M after being attached to the ceiling wall Mt in accordance with the operation of the differential device D and the like before the engine stops. Accordingly, when the differential device D starts its operation, the lubricant oil held in the bottomed hollow portion T can be quickly supplied to the rotation sliding portions rs between the pinions P and the pinion shaft PS via the oil guiding holes G in the peripheral walls of the bottomed hollow portions T due to the centrifugal force. Thus, from the beginning of the start of the operation, the rotation sliding portions rs between the pinions P and the pinion shaft PS can be sufficiently lubricated without delay.

In addition, in the embodiment, the plurality of first oil intake holes H1 and the plurality of second oil intake holes H2 each capable of taking the lubricant oil dripped from the ceiling wall Mt of the transmission case M into the differential case DC are formed in the outer peripheral wall of the differential case DC; and the positions and directions in which the first and second oil intake holes H1, H2 are formed are as described above. For these reasons, while the vehicle is travelling forward and the differential case DC is rotating in the normal rotation direction R at relatively low speed, the lubricant oil dripped from the ceiling wall Mt of the transmission case M can be efficiently taken into the differential case DC via the first and second oil intake holes H1, H2. Furthermore, the first oil intake holes H1, which are arranged at the front side in the normal rotation direction R of the pinions P and offset from the intermediate points m between the mutually-adjacent pinions P toward the pinions P, are capable of efficiently supplying the lubricant oil, which is taken into the differential case DC, to the meshing portions of the pinions P and the side gears S near the first oil intake holes H1. On the other hand, the second oil intake holes H2, which are arranged at the back side in the normal rotation direction R of the pinions P and offset from the intermediate points m toward the pinions P, are capable of supplying the lubricant oil, which is dripped from the ceiling wall Mt and is taken into the differential case DC, to the outer peripheral portion of the pinion shaft PS near the rotation center L of the differential case DC without the pinions P hindering the supply of the lubricant oil. From the outer peripheral portion thereof, the lubricant oil flows along the outer peripheral surface of the pinion shaft PS toward the outer ends of the pinion shaft PS due to the centrifugal force. Thereby, the lubricant oil can be efficiently supplied also to the rotation sliding portions rs between the pinion shaft PS and the pinions P. As a result of these, the lubricant oil dripped from the ceiling wall Mt of the transmission case M is efficiently supplied to not only the meshing portions of the pinions P which are in mesh with the side gears S, but also the rotation sliding portions rs between the pinions P and the pinion shaft PS. Thereby, the overall lubricating effect can be enhanced more.

Besides, part of an outer peripheral portion of the differential case DC of the embodiment may be, or does not have to be, immersed under the oil surface of the lubricant oil held in an inner bottom portion of the transmission case M. In the case where the part of the outer peripheral portion of the differential case DC is immersed under the oil surface thereof, when the vehicle is traveling forward and the differential case DC is rotating in the normal rotation direction R, the lubricant oil taken into the differential case DC via the oil intake holes H1, H2 and held in the differential case DC can be efficiently scooped up. For this reason, the parts inside the differential case DC can be lubricated more efficiently.

Meanwhile, in the conventional differential devices (particularly, the conventional differential devices each including a pinion (differential gear) inside a differential case, and a pair of side gears (output gears) meshing with the pinion (differential gear)) exemplified in Japanese Patent No. 4803871 and Japanese Patent Application KOKAI Publication No. 2002-364728, the number Z1 of teeth of the side gear (output gear) and the number Z2 of teeth of the pinion (differential gear) are generally set at 14 and 10, 16 and 10, or 13 and 9, respectively, as shown in Japanese Patent Application KOKAI Publication No. 2002-364728, for example. In these cases, the number-of-teeth ratios Z1/Z2 of the output gears to the differential gears are 1.4, 1.6 and 1.44, respectively. In addition, other publicly-known examples of the combination of the number Z1 of teeth and the number Z2 of teeth for conventional differential devices include 15 and 10, 17 and 10, 18 and 10, 19 and 10, and 20 and 10. In these cases, the number-of-teeth ratios Z1/Z2 are at 1.5, 1.7, 1.8, 1.9 and 2.0, respectively.

On the other hand, nowadays, there is an increase in the number of transmission systems which are under layout restrictions around their respective differential devices. Accordingly, the market demands that differential devices be sufficiently reduced in width (i.e., thinned) in the axial direction of their output shafts while securing the gear strength for the differential devices. However, the structural forms of the conventional existing differential devices are wide in the axial direction of the output shafts, as apparent from the gear combinations leading to the above-mentioned number-of-teeth ratios. This makes it difficult to satisfy the market demand.

With this taken into consideration, an attempt to find a concrete configuration example of the differential device D which can be sufficiently reduced in width (i.e., thinned) in the axial direction of the output shafts while securing the gear strength for the differential device has been made as follows, from a viewpoint different from that of the foregoing embodiment. Incidentally, the structures of the components of the differential device D of this configuration example are the same as the structures of the components of the differential device D of the foregoing embodiment which has been described using FIGS. 1 to 6. For this reason, the components of the configuration example will be denoted with the same reference signs as those of the embodiment, and descriptions for the structures will be omitted.

Figure 7:
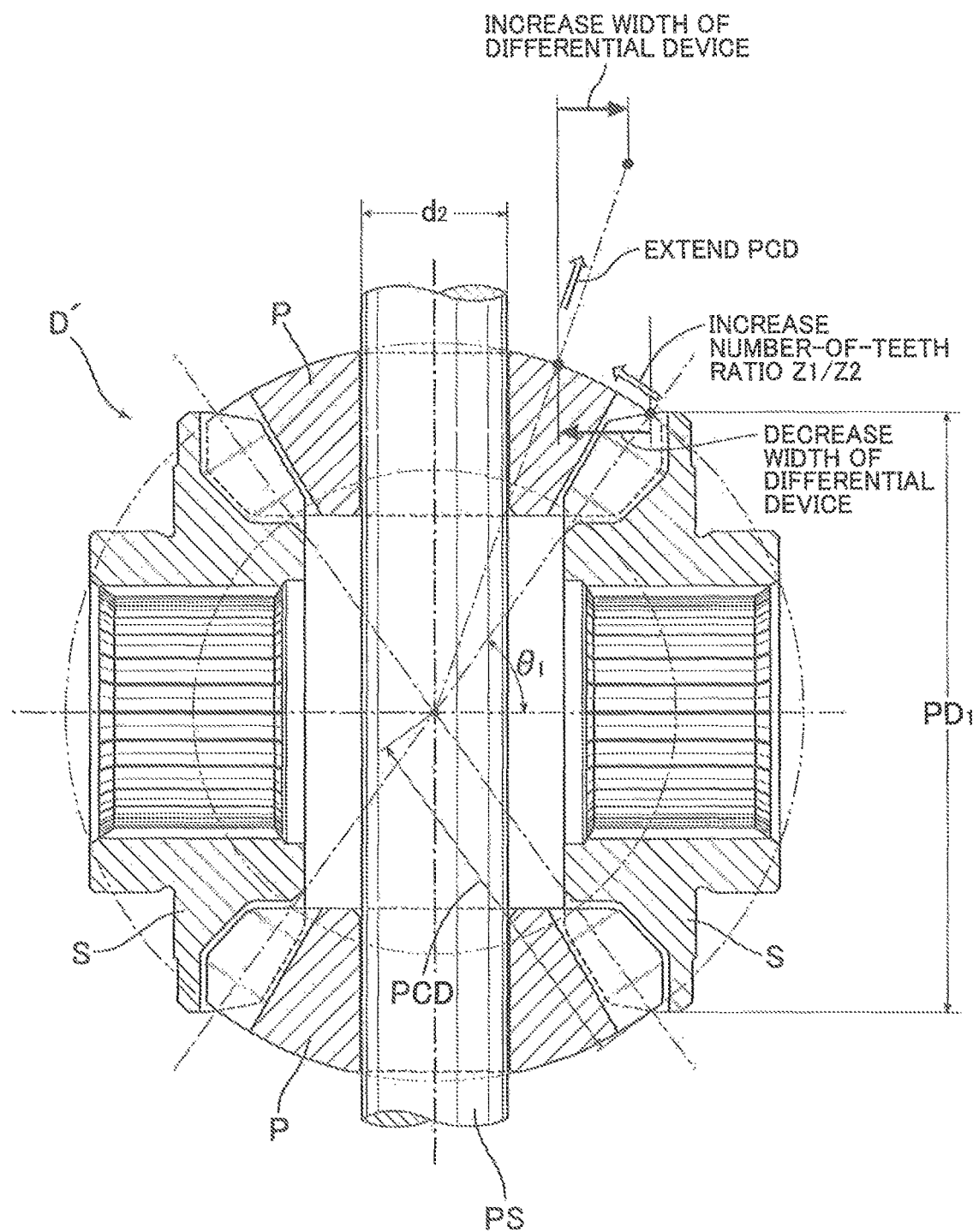
FIG. 7 is a longitudinal sectional view showing an example of a conventional differential device.

To begin with, let us explain a basic concept for sufficiently reducing the width of (i.e., thinning) the differential device D in the axial direction of the output shafts J referring to FIG. 7 together. The concept is as follows.

Approach [1] To make the number-of-teeth ratio Z1/Z2 of the side gear S, that is, the output gear to the pinion P, that is, the differential gear larger than the number-of-teeth ratio used for the conventional existing differential device. (This leads to a decrease in the module (accordingly the tooth thickness) of the gear and a resultant decrease in the gear strength, while leading to an increase in the pitch circle diameter of the side gear S, a resultant decrease in transmission load in the meshing portion of the gear, and a resultant increase in the gear strength. However, the gear strength as a whole decreases, as discussed below.)

Approach [2] To make the pitch cone distance PCD of the pinion P larger than the pitch cone distance in the conventional existing differential device. (This leads to an increase in the module of the gear and a resultant increase in the gear strength, while leading to an increase in the pitch circle diameter of the side gear S, a resultant decrease in the transmission load in the meshing portion of the gear, and a resultant increase in the gear strength. Thus, the gear strength as a whole increases greatly, as discussed below.)

For these reasons, when the number-of-teeth ratio Z1/Z2 and the pitch cone distance PCD are set such that the amount of decrease in the gear strength based on Approach [1] is equal to the amount of increase in the gear strength based on Approach [2] or such that the amount of increase in the gear strength based on Approach [2] is greater than the amount of decrease in the gear strength based on Approach [1], the gear strength as a whole can be made equal to or greater than that of the conventional existing differential device.

Next, let us concretely examine how the gear strength changes based on Approaches [1] and [2] using mathematical expressions. Incidentally, the examination will be described in the following embodiment. First of all, a "reference differential device" is defined as a differential device D' in which the number Z1 of teeth of the side gear S is set at 14 while the number Z2 of teeth of the pinion P is set at 10. In addition, for each variable, a "change rate" is defined as a rate of change in the variable in comparison with the corresponding base number (i.e., 100%) of the reference differential device D'.

Approach [1]

When MO, $PD_1$, $\theta_1$, PCD, F, and TO respectively denote the module, pitch circle diameter, pitch angle, pitch cone distance, transmission load in the gear meshing portion, and transmission torque in the gear meshing portion, of the side gear S, general formulae concerning the bevel gear provide $MO = PD_1/Z1$, $PD_1 = 2PCD \cdot \sin \theta_1$, and $\theta_1 = \tan^{-1}(Z1/Z2)$.

From these expressions, the module of the gear is expressed with $$MO = 2PCD \cdot \sin\{\tan^{-1}(Z1/Z2)\}/Z1. \tag{1}$$

Meanwhile, the module of the reference differential device D' is expressed with $2PCD \cdot \sin\{\tan^{-1}(7/5)\}/14$.

Dividing the term on the right side of Expression (1) by $2PCD \cdot \sin\{\tan^{-1}(7/5)\}/14$ yields a module change rate with respect to the reference differential device D', which is expressed with Expression (2) given below.

$$\text{Module Change Rate} = \frac{14 \cdot \sin\left(\tan^{-1}\frac{z1}{z2}\right)}{z1 \cdot \sin\left(\tan^{-1}\frac{7}{5}\right)} \tag{2}$$

In addition, the section modulus of the tooth portion corresponding to the gear strength (i.e., the bending strength of the tooth portion) is in proportion to the square of the tooth thickness, while the tooth thickness has a substantially linear relationship with the module MO. For these reasons, the square of the module change rate corresponds to a rate of change in the section modulus of the tooth portion, accordingly a gear strength change rate. In other words, based on Expression (2) given above, the gear strength change rate is expressed with Expression (3) given below. Expression (3) is represented by a line L1 in FIG. 8 when the number Z2 of teeth of the pinion P is 10. From the line L1, it is learned that as the number-of-teeth ratio Z1/Z2 becomes larger, the module becomes smaller and the gear strength accordingly becomes lower.

$$\text{Gear Strength Change Rate} = (\text{Module Change Rate})^2 \tag{3}$$
$$= \frac{196 \cdot \sin^2\left(\tan^{-1}\frac{z1}{z2}\right)}{z1^2 \cdot \sin^2\left(\tan^{-1}\frac{7}{5}\right)}$$

Meanwhile, based on the general formulae concerning the bevel gear, a torque transmission distance of the side gear S is expressed with Expression (4) given below.

$$PD_1/2 = PCD \cdot \sin\{\tan^{-1}(Z1/Z2)\} \tag{4}$$

From the torque transmission distance $PD_1/2$, the transmission load F is given as $F = 2TO/PD_1$.

For this reason, when the torque TO of the side gear S of the reference differential device D' is constant, the transmission load F is in inverse proportion to the pitch circle diameter $PD_1$. In addition, the rate of change in the transmission load F is in inverse proportion to the gear strength change rate.

For this reason, the gear strength change rate is equal to the rate of change in the pitch circle diameter $PD_1$.

As a result, using Expression (4), the rate of change in the pitch circle diameter $PD_1$ is expressed with Expression (5) given below.

$$\text{Gear Strength Change Rate} = PD_1 \text{ Change Rate} \quad (5)$$

$$= \frac{\sin\left(\tan^{-1}\frac{z1}{z2}\right)}{\sin\left(\tan^{-1}\frac{7}{5}\right)}$$

Figure 8:
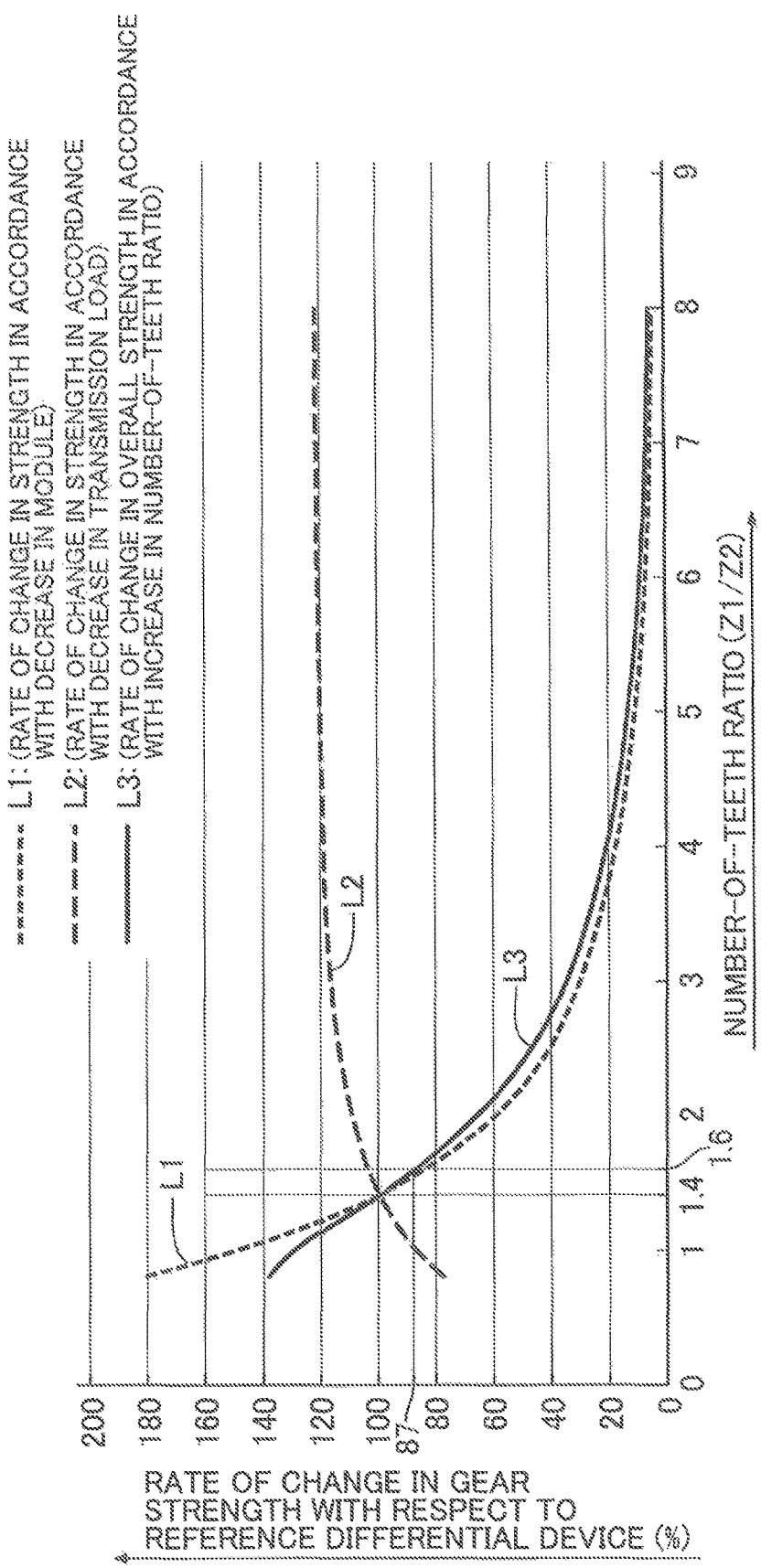
FIG. 8 is a graph showing a relationship of gear strength change rates with a number-of-teeth ratio where the number of teeth of the pinion is set at 10.

Expression (5) is represented by a line L2 in FIG. 8 when the number Z2 of teeth of the pinion P is 10. From the line L2, it is learned that as the number-of-teeth ratio Z1/Z2 becomes larger, the transmission load becomes smaller, and the gear strength accordingly becomes stronger.

Eventually, the gear strength change rate in accordance with the increase in the number-of-teeth ratio Z1/Z2 is expressed with Expression (6) given below by multiplying a rate of decrease change in the gear strength in accordance with the decrease in the module MO (the term on the right side of Expression (3) shown above) and a rate of increase change in the gear strength in accordance with the decrease in the transmission load (the term on the right side of Expression (5) shown above).

$$\text{Gear Strength Change Rate in Accordance} \quad (6)$$

$$\text{with Number-of-Teeth Ratio} = \frac{1.96 \cdot \sin^3\left(\tan^{-1}\frac{z1}{z2}\right)}{z1^2 \cdot \sin^3\left(\tan^{-1}\frac{7}{5}\right)}$$

Expression (6) is represented by a line L3 in FIG. 8 when the number Z2 of teeth of the pinion P is 10. From the line L3, it is learned that as the number-of-teeth ratio Z1/Z2 becomes larger, the gear strength as a whole becomes lower.

Approach [2]

In a case of increasing the pitch cone distance PCD of the pinion P more than the pitch cone distance in the reference differential device D', when PCD1, PCD2 respectively denote the pitch cone distance PCD before the change and the pitch cone distance PCD after the change, the module change rate in accordance with the change in the pitch cone distance PCD is expressed with

PCD2/PCD1 if the number of teeth is constant, based on the above-mentioned general formulae concerning the bevel gear.

Meanwhile, as being clear from the above-discussed process for deriving Expression (3), the gear strength change rate of the side gear S corresponds to the square of the module change rate. For this reason, $$\text{Gear Strength Change Rage in Accordance with} \quad (7)$$
$$\text{Increase in Module} = (PCD2/PCD1)^2$$

is obtained. Expression (7) is represented by a line L4 in FIG. 9. From the line L4, it is learned that as the pitch cone distance PCD becomes larger, the module becomes larger, and the gear strength accordingly becomes stronger.

In addition, when the pitch cone distance PCD is made larger than the pitch cone distance PCD1 in the reference differential device D', the transmission load F decreases. Thereby, the gear strength change rate becomes equal to the rate of change in the pitch circle diameter $PD_1$, as described above. In addition, the pitch circle diameter $PD_1$ of the side gear S is in proportion to the pitch cone distance PCD. For these reasons, $$\text{Gear Strength Change Rate in Accordance with} \quad (8)$$
$$\text{Decrease in Transmission Load} = PCD2/PCD1$$

is obtained.

Figure 9:
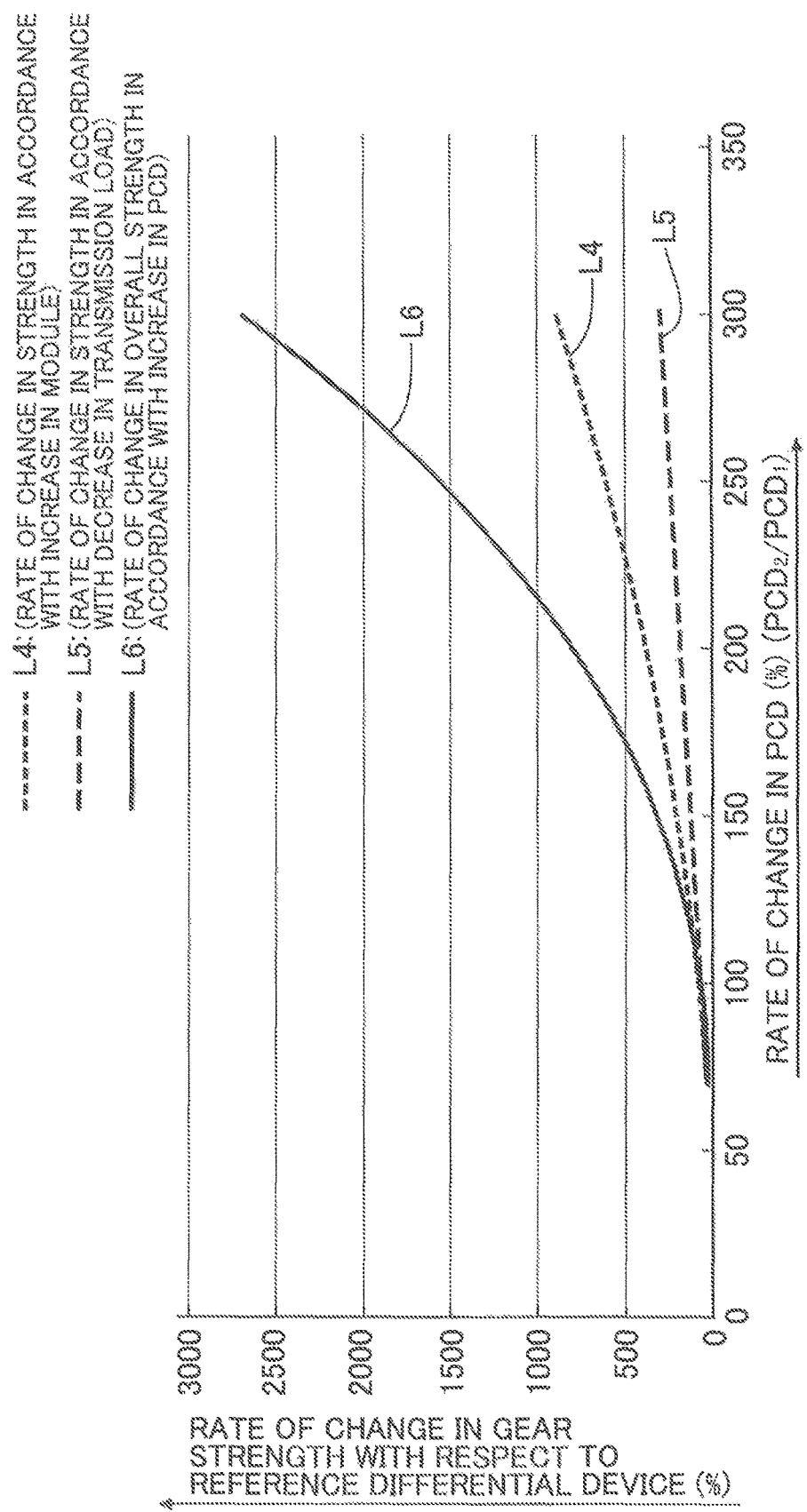
FIG. 9 is a graph showing a relationship of the gear strength change rates with a pitch cone distance change rate.

Expression (8) is represented by a line L5 in FIG. 9. From the line L5, it is learned that as the pitch cone distance PCD becomes larger, the transmission load becomes lower, and the gear strength accordingly becomes stronger.

In addition, the gear strength change rate in accordance with the increase in the pitch cone distance PCD is expressed with Expression (9) given below by multiplying the rate of increase change in the gear strength in accordance with the increase in the module MO (the term on the right side of Expression (7) shown above) and the rate of increase change in the gear strength in accordance with the decrease in the transmission load in response to the increase in the pitch circle diameter PD (the term on the right side of Expression (8) shown above).

$$\text{Gear Strength Change Rate in Accordance with} \quad (9)$$
$$\text{Increase in Pitch Cone Distance} = (PCD2/PCD1)^3$$

Expression (9) is represented by a line L6 in FIG. 9. From the line L6, it is learned that as the pitch cone distance PCD becomes larger, the gear strength is increased greatly.

With these taken into consideration, the combination of the number-of-teeth ratio Z1/Z2 and the pitch cone distance PCD is determined such that: the decrease in the gear strength based on Approach [1] given above (the increase in the number-of-teeth ratio) is sufficiently compensated for by the increase in the gear strength based on Approach [2] given above (the increase in the pitch cone distance) so as to make the overall gear strength of the differential device equal to or greater than the gear strength of the conventional existing differential device.

For example, 100% of the gear strength of the side gear S of the reference differential device D' can be kept by setting the gear strength change rate in accordance with the increase in the number-of-teeth ratio (i.e., the term on the right side of Expression (6) given above) obtained based on Approach [1] given above and the gear strength change rate in accordance with the increase in the pitch cone distance (i.e., the term on the right side of Expression (9) given above) obtained based on Approach [2] given above, such that the multiplication of these gear strength change rates becomes equal to 100%. Thereby, the relationship between the number-of-teeth ratio Z1/Z2 and the rate of change in the pitch cone distance PCD for keeping 100% of the gear strength of the reference differential device D' can be obtained from Expression (10) given below. Expression (10) is represented by a line L7 in FIG. 10 when the number Z2 of teeth of the pinion P is 10.

$$PCD2/PCD1 = \left(100\% \Big/ \begin{array}{c}\text{Gear Strength Change}\\ \text{Rate in Accordance with}\\ \text{Number-of-Teeth Ratio}\end{array}\right)^{\frac{1}{3}} \quad (10)$$

$$= \left\{\frac{1}{\frac{196 \cdot \sin^3\left(\tan^{-1}\frac{z1}{z2}\right)}{z1^2 \cdot \sin^3\left(\tan^{-1}\frac{7}{5}\right)}}\right\}^{\frac{1}{3}}$$

$$= \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)}$$

Figure 10:
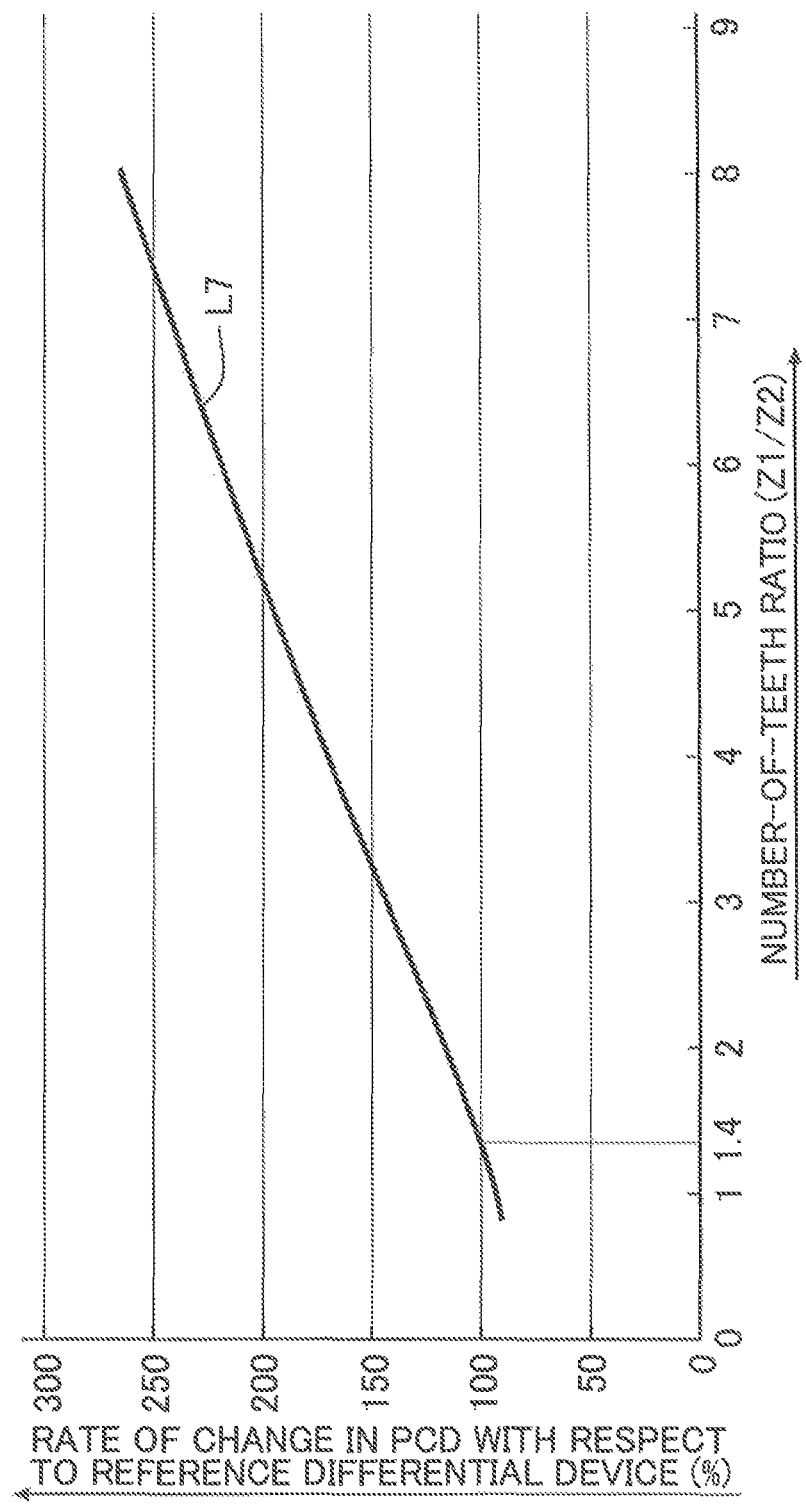
FIG. 10 is a graph showing a relationship of the pitch cone distance change rate with the number-of-teeth ratio for keeping 100% of the gear strength where the number of teeth of the pinion is set at 10.

Like this, Expression (10) represents the relationship between the number-of-teeth ratio Z1/Z2 and the rate of change in the pitch cone distance PCD for keeping 100% of the gear strength of the reference differential device D' when the number-of-teeth ratio Z1/Z2 is equal to 14/10 (see FIG. 10). The rate of change in the pitch cone distance PCD represented by the vertical axis in FIG. 10 can be converted into a ratio of d2/PCD where d2 denotes a shaft diameter of the pinion shaft PS (i.e., the pinion support portion) supporting the pinion P.

TABLE 1

| PCD | SHAFT DIAMETER (d2) | d2/PCD |
|---|---|---|
| 31 | 13 | 42% |
| 35 | 15 | 43% |
| 38 | 17 | 45% |
| 39 | 17 | 44% |
| 41 | 18 | 44% |
| 45 | 18 | 40% |

To put it concretely, in the conventional existing differential device, the increase change in the pitch cone distance PCD correlates with the increase change in the shaft diameter d2 as shown in Table 1, and can be represented by a decrease in the ratio of d2/PCD when d2 is constant. In addition, in the conventional existing differential device, d2/PCD falls within a range of 40% to 45% as shown in Table 1 given above when the conventional existing differential device is the reference differential device D', and the gear strength increases as the pitch cone distance PCD increases. Judging from these, the gear strength of the differential device can be made equal to or greater than the gear strength of the conventional existing differential device by determining the shaft diameter d2 of the pinion shaft PS and the pitch cone distance PCD such that at least d2/PCD is equal to or less than 45%, when the differential device is the reference differential device D'. In other words, when the differential device is the reference differential device D', it suffices if d2/PCD≤0.45 is satisfied. In this case, when PCD2 denotes the pitch cone distance PCD which is changed to become larger or less than the pitch cone distance PCD1 of the reference differential device D', it suffices if $$d2/PCD2 \leq 0.45/(PCD2/PCD1) \quad (11)$$

is satisfied. Furthermore, the application of Expression (11) to Expression (10) given above can convert the relationship between d2/PCD and the number-of-teeth ratio Z1/Z2 into Expression (12) given below.

$$d2/PCD \leq 0.45/(PCD2/PCD1) \quad (12)$$

$$= 0.45 \Bigg/ \left\{ \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)} \right\}$$

$$= 0.45 \cdot \left(\frac{14}{z1}\right)^{\frac{2}{3}} \cdot \frac{\sin\left(\tan^{-1}\frac{z1}{z2}\right)}{\sin\left(\tan^{-1}\frac{7}{5}\right)}$$

Figure 11:
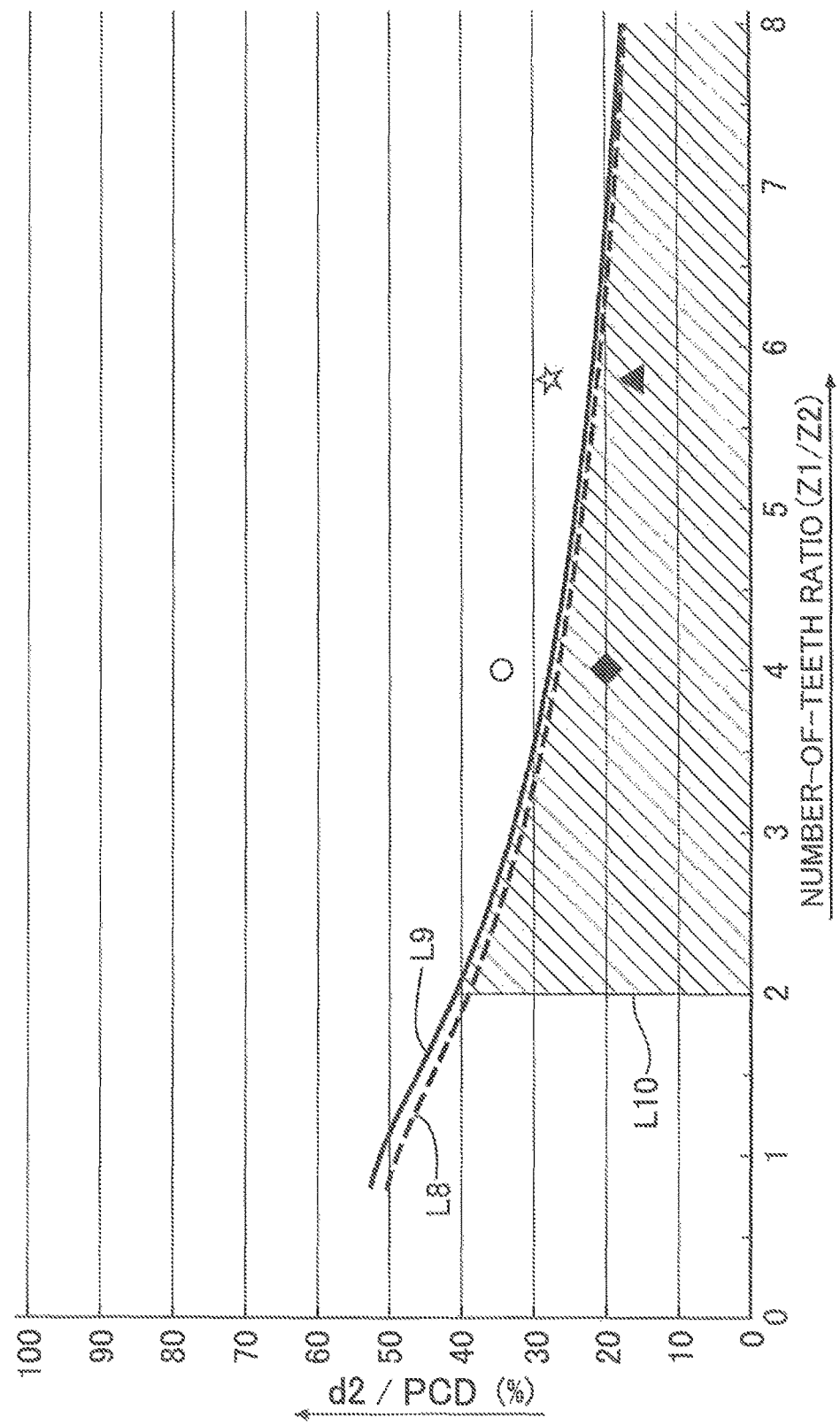
FIG. 11 is a graph showing a relationship between a shaft diameter/pitch cone distance ratio and the number-of-teeth ratio where the number of teeth of the pinion is set at 10.

When the Expression (12) is equal, Expression (12) can be represented by a line L8 in FIG. 11 if the number Z2 of teeth of the pinion P is 10. When the Expression (12) is equal, the relationship between d2/PCD and the number-of-teeth ratio Z1/Z2 keeps 100% of the gear strength of the reference differential device D'.

Meanwhile, in conventional existing differential devices, usually, not only the number-of-teeth ratio Z1/Z2 equal to 1.4 used above to explain the reference differential device D' but also the number-of-teeth ratio Z1/Z2 equal to 1.6 or 1.44 is adopted. This needs to be taken into consideration. Based on the assumption that the reference differential device D' (Z1/Z2=1.4) guarantee the necessary and sufficient gear strength, that is, 100% of gear strength, it is learned, as being clear from FIG. 8, that the gear strength of conventional existing differential devices in which the number-of-teeth ratio Z1/Z2 is 16/10 is as low as 87% of the gear strength of the reference differential device D'. The general practice, however, is that the gear strength low at that level is accepted as practical strength and actually used for conventional existing differential devices. Judging from this, one may consider that gear strength which needs to be sufficiently secured for and is acceptable for the differential device which is thinned in the axial direction is at least equal to, or greater than, 87% of the gear strength of the reference differential device D'.

From the above viewpoint, first, a relationship for keeping 87% of the gear strength of the reference differential device D' is obtained between the number-of-teeth ratio Z1/Z2 and the rate of change in the pitch cone distance PCD. The relationship can be expressed with Expression (10') given below by performing a calculation by emulating the process of deriving Expression (10) given above (i.e., a calculation such that the multiplication of the gear strength change rate in accordance with the increase in the number-of-teeth ratio (i.e., the term on the right side of Expression (6) given above) and the gear strength change rate in accordance with the increase in the pitch cone distance (i.e., the term on the right side of Expression (9) given above) becomes equal to 87%).

$$PCD2/PCD1 = \left(87\% \Bigg/ \begin{array}{c} \text{Gear Strength Change} \\ \text{Rate in Accordance with} \\ \text{Number-of-Teeth Ratio} \end{array}\right)^{\frac{1}{3}} \quad (10')$$

$$= \left\{ \frac{0.87}{\frac{196 \cdot \sin^3\left(\tan^{-1}\frac{z1}{z2}\right)}{z1^2 \cdot \sin^3\left(\tan^{-1}\frac{7}{5}\right)}} \right\}^{\frac{1}{3}}$$

$$= 0.87^{\frac{1}{3}} \cdot \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)}$$

Thereafter, when Expression (11) given above is applied to Expression (10') given above, the relationship between d2/PCD and the number-of-teeth ratio Z1/Z2 for keeping 87% or more of the gear strength of the reference differential device D' can be converted into Expression (13) given below. However, the calculation is performed using the following rules that: the number of significant figures is three for all the factors, except for factors expressed with variables; digits below the third significant figure are rounded down; and although the result of the calculation cannot avoid approximation by an calculation error, the mathematical expression uses the equals sign because the error is negligible.

$$d2/PCD \leq 0.45 \Big/ \left\{ 0.87^{\frac{1}{3}} \cdot \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)} \right\} \quad (13)$$

$$= 3.36 \cdot \left(\frac{1}{z1}\right)^{\frac{2}{3}} \cdot \sin\left(\tan^{-1}\frac{z1}{z2}\right)$$

When the Expression (13) is equal, Expression (13) can be represented by FIG. 11 (more specifically, by a line L9 in FIG. 11) if the number Z2 of teeth of the pinion P is 10. In this case, an area corresponding to Expression (13) is an area on and under the line L9 in FIG. 11. In addition, a specific area (a hatched area in FIG. 11) satisfying Expression (13) and located on the right side of a line L10 in FIG. 11 where the number-of-teeth ratio Z1/Z2>2.0 is satisfied is an area for setting Z1/Z2 and d2/PCD which enable at least 87% or more of the gear strength of the reference differential device D' to be secured particularly for the differential device thinned in the axial direction where the number Z2 of teeth of the pinion P is 10 and the number-of-teeth ratio Z1/Z2 is greater than 2.0. For reference, a black diamond in FIG. 11 represents an example where the number-of-teeth ratio Z1/Z2 and d2/PCD are set at 40/10 and 20.00%, respectively, and a black triangle in FIG. 11 represents an example where the number-of-teeth ratio Z1/Z2 and d2/PCD are set at 58/10 and 16.67%, respectively. These examples fall within the specific area. A result of a simulation for strength analysis on these examples has confirmed that the gear strength equal to or greater than those of the conventional differential devices (more specifically, the gear strength equal to or greater than 87% of the gear strength of the reference differential device D') were obtained.

Thus, the thinned differential device falling within the specific area is configured as the differential device which, as a whole, is sufficiently reduced in width in the axial direction of the output shafts while securing the gear strength (for example, static torsion load strength) and the maximum amount of torque transmission at approximately the same levels as the conventional existing differential devices which are not thinned in the axial direction thereof. Accordingly, it is possible to achieve effects of: being capable of easily incorporating the differential device in a transmission system, which is under many layout restrictions around the differential device, with great freedom and no specific difficulties; being extremely advantageous in reducing the size of the transmission system; and the like.

Moreover, when the thinned differential device in the specific area has, for example, the structure of the above-mentioned embodiment (more specifically, the structures shown in FIGS. 1 to 6), the thinned differential device in the specific area can obtain an effect derived from the structure shown in the embodiment.

Figure 12:
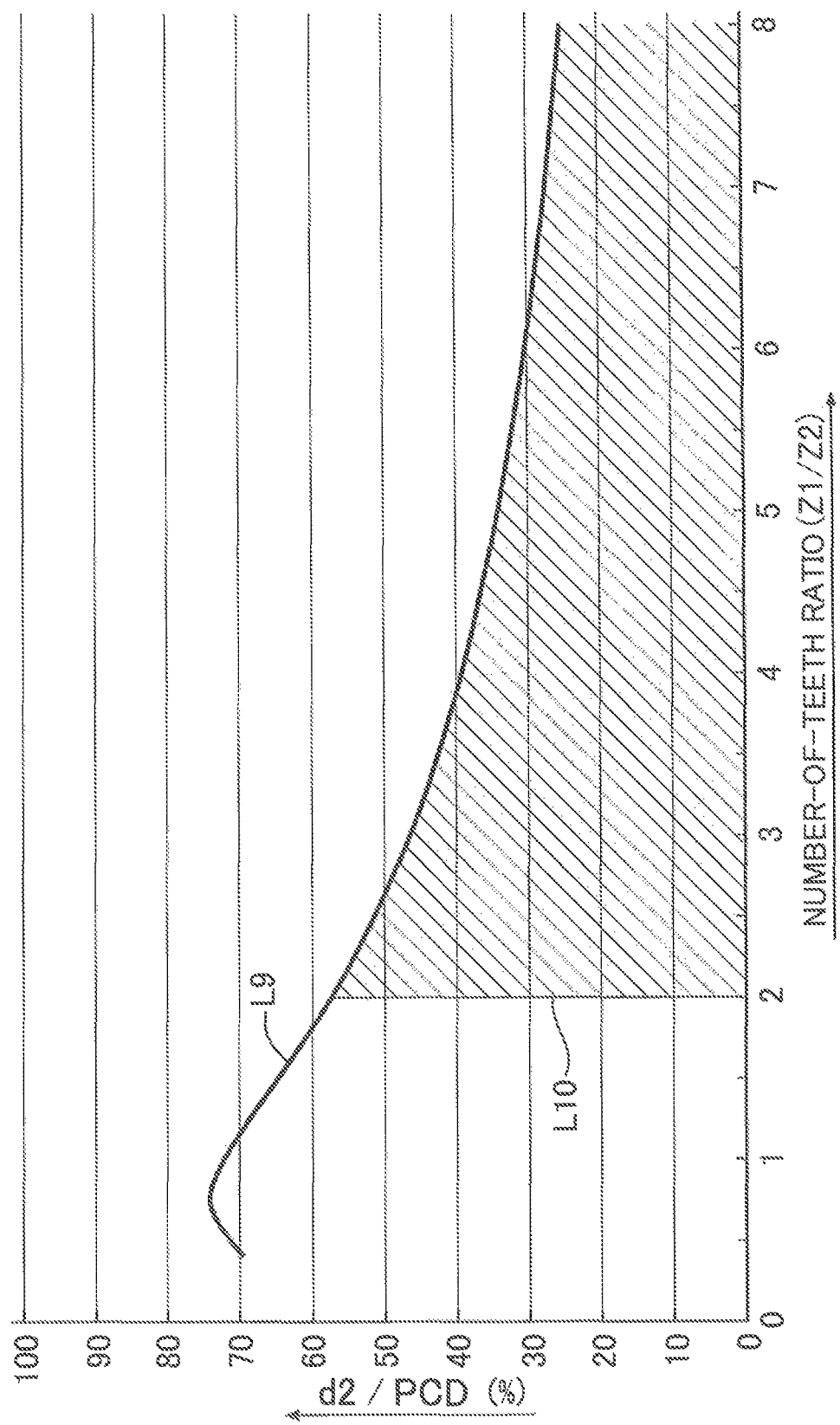
FIG. 12 is a graph showing a relationship between the shaft diameter/pitch cone distance ratio and the number-of-teeth ratio where the number of teeth of the pinion is set at 6.

It should be noted that although the foregoing descriptions (the descriptions in connection with FIGS. 8, 10, 11 in particular) have been provided for the differential device in which the number Z2 of teeth of the pinion P is set at 10, the present invention is not limited to this. For example, when the number Z2 of teeth of the pinion P is set at 6, 12 and 20, too, the thinned differential device capable of achieving the above effects can be represented by Expression (13), as shown by hatched areas in FIGS. 12, 13 and 14. In other words, Expression (13) derived in the above-described manner is applicable regardless of the change in the number Z2 of teeth of the pinion P. For example, even when the number Z2 of teeth of the pinion P is set at 6, 12 and 20, the above effects can be obtained by setting the number Z1 of teeth of the side gear S, the number Z2 of teeth of the pinion P, the shaft diameter d2 of the pinion shaft PS and the pitch cone distance PCD such that Expression (13) is satisfied, like in the case where the number Z2 of teeth of the pinion P is set at 10.

Figure 13:
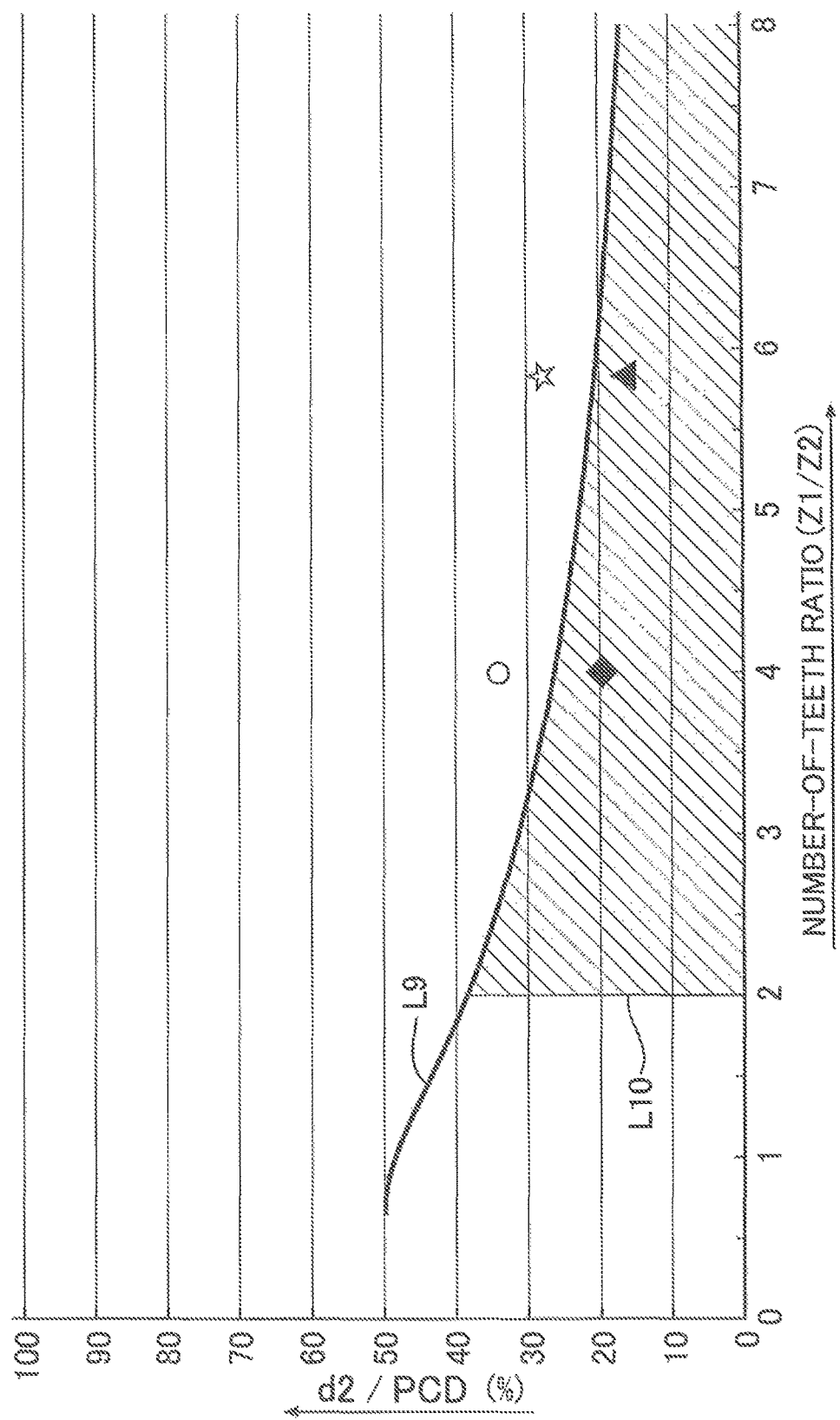
FIG. 13 is a graph showing a relationship between the shaft diameter/pitch cone distance ratio and the number-of-teeth ratio where the number of teeth of the pinion is set at 12.
Figure 14:
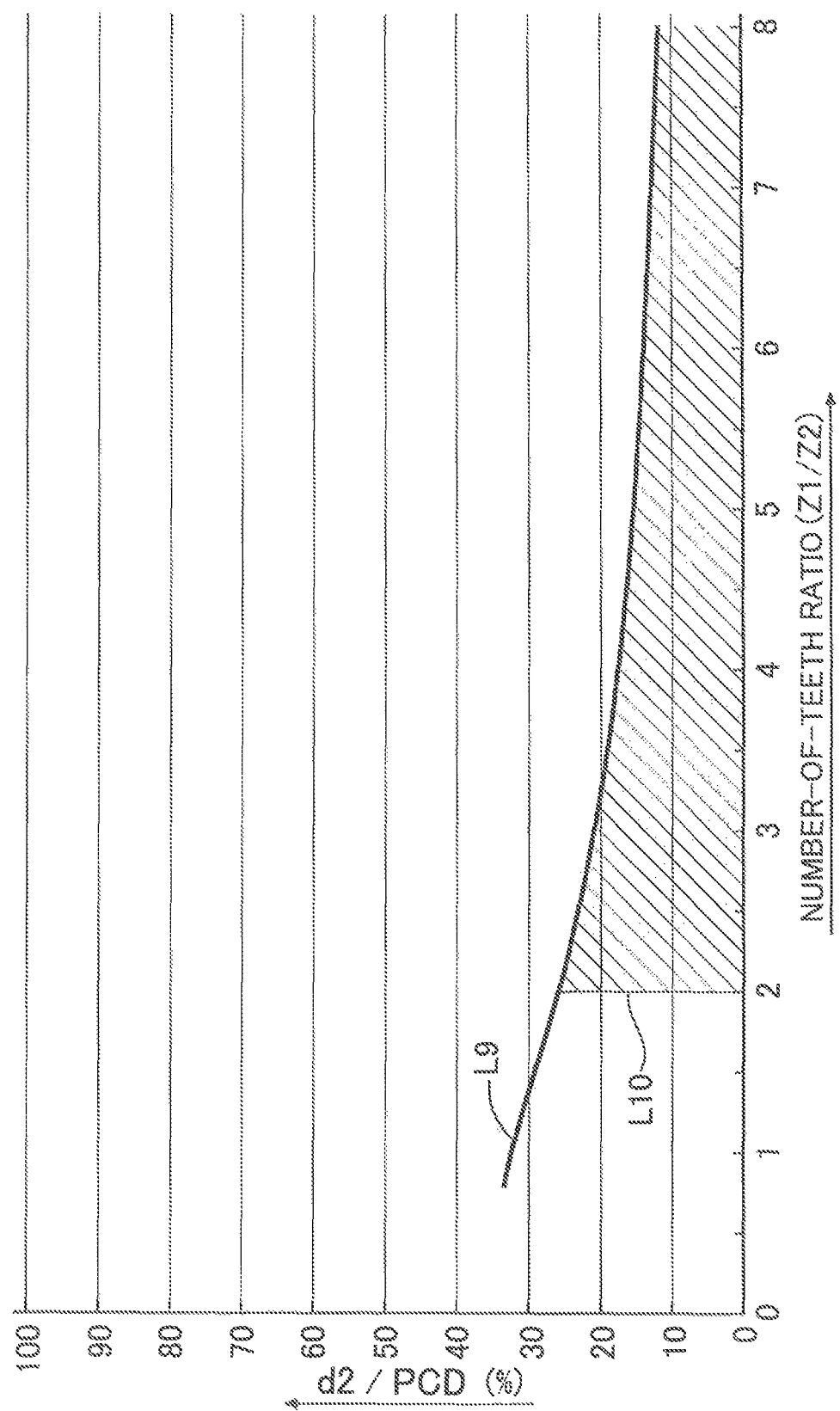
FIG. 14 is a graph showing a relationship between the shaft diameter/pitch cone distance ratio and the number-of-teeth ratio where the number of teeth of the pinion is set at 20.

Furthermore, for reference, a black diamond in FIG. 13 represents an example where when the number Z2 of teeth of the pinion P is 12, the number-of-teeth ratio Z1/Z2 and d2/PCD are set at 48/12 and 20.00%, respectively, and a black triangle in FIG. 13 represents an example where when the number Z2 of teeth of the pinion P is 12, the number-of-teeth ratio Z1/Z2 and d2/PCD are set at 70/12 and 16.67%, respectively. A result of a simulation for strength analysis on these examples has confirmed that the gear strength equal to or greater than those of the conventional differential devices (more specifically, the gear strength equal to or greater than 87% of the gear strength of the reference differential device D') were obtained. Moreover, these examples fall within the specific area, as shown in FIG. 13.

As comparative examples, let us show examples which do not fall within the specific area. A white star in FIG. 11 represents an example where when the number Z2 of teeth of the pinion P is for example 10, the number-of-teeth ratio Z1/Z2 and d2/PCD are set at 58/10 and 27.50%, respectively, and a white circle in FIG. 11 represents an example where when the number Z2 of teeth of the pinion P is for example 10, the number-of-teeth ratio Z1/Z2 and d2/PCD are set at 40/10 and 34.29%, respectively. A white star in FIG. 13 represents an example where when the number Z2 of teeth of the pinion P is for example 12, the number-of-teeth ratio Z1/Z2 and d2/PCD are set at 70/12 and 27.50%, respectively, and a white circle in FIG. 13 represents an example where when the number Z2 of teeth of the pinion P is for example 12, the number-of-teeth ratio Z1/Z2 and d2/PCD are set at 48/12 and 34.29%, respectively. A result of a simulation for strength analysis on these examples has confirmed that the gear strength equal to or greater than those of the conventional differential devices (more specifically, the gear strength equal to or greater than 87% of the gear strength of the reference differential device D') were not obtained. In other words, the above effects cannot be obtained from the examples which do not fall within the specific area.

Although the embodiment of the present invention have been described, the present invention is not limited to the foregoing embodiment. Various design changes may be made to the present invention within a scope not departing from the gist of the present invention.

For example, the foregoing embodiment has shown the differential device in which: the speed reduction gear mechanism RG formed from the planetary gear mechanism is adjacently placed on the one side of the differential case DC; the output-side element (carrier 53) of the speed reduction gear mechanism RG is connected to the differential case DC (cover portion C'); and the power from the power source is transmitted to the differential case DC via the speed reduction gear mechanism RG. However, an output-side element of a speed reduction gear mechanism formed from a gear mechanism other than the planetary gear mechanism may be connected to the differential case DC.

Furthermore, without using the above mentioned speed reduction gear mechanism, an input tooth portion (final driven gear) receiving the power from the power source may be integrally formed on, or afterward fixed to, the outer peripheral portion of the differential case DC so that the power from the power source is transmitted to the differential case DC via the input tooth portion. In this case, specific parts of the outer peripheral surface of the differential case DC, for example the opening portions of the hollow cylindrical portions T and the opening portions of the first and second oil intake holes H1, H2, are always exposed to the inner space 1 of the transmission case M without being covered with the input tooth portion.

Moreover, the foregoing embodiment has shown the differential device in which the oil introduction passages guiding the lubricant oil to the inner side surfaces of the intermediate wall portions Sw of the side gears S are the oil passages extending from the lightening portions 8 formed in the side wall portions Cs of the cover portions C, C' to the penetrating oil passages 15 via the oil guide grooves 17. Nevertheless, instead of such oil passages, or in addition to such oil passages, other oil introduction passages are usable as well. Other oil introduction passages may be obtained, for example, by: extending the boss portions Cb of the cover portions C, C' of the differential case DC outward beyond the shaft portions Sj of the side gears S in the axial direction; rotatably fitting the output shafts J to inner peripheral surfaces of the extension portions of the boss portions Cb; and providing spiral grooves in a recess shape to at least one of the fitting surfaces of the extension portions of the boss portions Cb and the output shafts J (for example, the inner peripheral surfaces of the extension portions of the boss portions Cb). Thereby, the lubricant oil existing around the extension portions of the boss portions Cb in the inner space 1 of the transmission case M can be efficiently supplied to spline-fitting portions 6 between the shaft portions Sj of the side gears S and the output shafts J, accordingly to the inner side surfaces of the intermediate wall portions Sw, via the spiral grooves while the boss portions Cb and the output shafts J are rotating relative to each other. In this case, if lubricant oil passages extending in the axial direction are formed by removing some spline teeth from the spline-fitting portions 6, the lubricant oil can be more efficiently supplied to the inner side surfaces of the intermediate wall portions Sw of the side gears S. Furthermore, it should be noted that instead of the spiral grooves, or in addition to the spiral grooves, the lubricant oil may be pressure-fed and supplied from the oil pump to the spline-fitting portions 6 between the shaft portions Sj of the side gears S and the output shafts J so that the lubricant oil supplied under pressure is supplied to the inner side surfaces of the intermediate wall portions Sw of the side gears S via the spline-fitting portions 6.

Moreover, the foregoing embodiment where the back surfaces of the pair of side gears S are covered with the pair of cover portions C, C' has been shown, however, in the present invention, the back surface of only one side gear S may be provided with the cover portion. In this case, for example, the drive member (for example, the carrier 53 of the speed reduction gear mechanism RG) situated upstream of a power transmission passage may be disposed on the side gear side provided with no cover portion so that the drive member and the differential case DC are connected to each other.

In addition, although the foregoing embodiment has been shown in which the differential device D allows the difference in rotational speed between the left and right axles, the differential device of the present invention may be carried out as a center differential configured to absorb the difference in rotational speed between front wheels and rear wheels.

What is claimed is:

1. A vehicle differential device which distributively transmits rotational force to a pair of output shafts, the rotational force being transmitted from a vehicle-installed power source to a differential case, the differential case being housed in a transmission case, comprising:
   pinions placed in the differential case;
   a pinion shaft placed to pass through a rotation axis of the differential case, supported in the differential case and penetrating through and rotatably supporting the pinions; and
   a pair of side gears which are in mesh with the pinions inside the differential case and connected respectively to the pair of output shafts, wherein
   the differential case includes a plurality of oil intake holes being respectively at positions offset toward the pinions from an intermediate point between two of the pinions positioned adjacent in a peripheral direction of the differential case, the oil intake holes passing through an outer peripheral wall of the differential case in an inside-outside direction and being capable of taking lubricant oil in the transmission case into the differential case,
   the oil intake holes are formed such that as seen in a projection plane orthogonal to the rotation axis, axes of the oil intake holes extending from inner opening ends to outer opening ends of the oil intake holes are inclined forward in a rotational direction of the differential case in forward traveling of a vehicle, and
   as seen in the projection plane, the pinions are placed outside areas interposed between first imaginary lines and second imaginary lines, the first imaginary lines joining the rotation axis and one ends in a peripheral direction of the inner opening ends of the oil intake holes, the second imaginary lines joining the rotation axis and the other ends in the peripheral direction of the inner opening ends of the oil intake holes.

2. The vehicle differential device according to claim 1, wherein the side gears include:
   shaft portions connected respectively to the pair of output shafts;
   the gear portions separating outward from the shaft portions in the radial direction; and
   intermediate wall portions each having a flat shape and extending outward from inner end portions of the shaft portions in the radial direction.

3. A vehicle differential device which distributively transmits rotational force to a pair of output shafts, the rotational force being transmitted from a vehicle-installed power source to a differential case, the differential case being housed in a transmission case, comprising:
   differential gears placed in the differential case;
   a differential gear support portion placed to pass through a rotation axis of the differential case, supported in the differential case and rotatably supporting the differential gears; and
   a pair of output gears which are in mesh with the differential gears inside the differential case and connected respectively to the pair of output shafts, wherein
   the differential case includes a plurality of oil intake holes being respectively at positions offset toward the differential gears from an intermediate point between two of the differential gears positioned adjacent in a peripheral direction of the differential case, the oil intake holes passing through an outer peripheral wall of the differential case in an inside-outside direction and being capable of taking lubricant oil in the transmission case into the differential case, the oil intake holes are formed such that as seen in a projection plane orthogonal to the rotation axis, axes of the oil intake holes extending from inner opening ends to outer opening ends of the oil intake holes are inclined forward in a rotational direction of the differential case in forward traveling of a vehicle, and as seen in the projection plane, the differential gears are placed outside areas interposed between first imaginary lines and second imaginary lines, the first imaginary lines joining the rotation axis and one ends in a peripheral direction of the inner opening ends of the oil intake holes, the second imaginary lines joining the rotation axis and the other ends in the peripheral direction of the inner opening ends of the oil intake holes, wherein $$d2/PCD \leq 3.36 \cdot \left(\frac{1}{z1}\right)^{\frac{2}{3}} \cdot \sin\left(\tan^{-1}\frac{z1}{z2}\right)$$

is satisfied, and

Z1/Z2>2 is satisfied, where Z1, Z2, d2 and PCD denote the number of teeth of each of the output gears, the number of teeth of the differential gear, a diameter of the differential gear support portion and a pitch cone distance, respectively.

4. The vehicle differential device according to claim 3, wherein
Z1/Z2≥4 is satisfied.

5. The vehicle differential device according to claim 3, wherein
Z1/Z2≥5.8 is satisfied.

6. The vehicle differential device according to claim 1, wherein cross sections of the oil intake holes orthogonal to the axes of the oil intake holes are each formed in a circular shape.

7. The vehicle differential device according to claim 2, wherein cross sections of the oil intake holes orthogonal to the axes of the oil intake holes are each formed in a circular shape.

8. The vehicle differential device according to claim 3, wherein cross sections of the oil intake holes orthogonal to the axes of the oil intake holes are each formed in a circular shape.

9. The vehicle differential device according to claim 4, wherein cross sections of the oil intake holes orthogonal to the axes of the oil intake holes are each formed in a circular shape.

10. The vehicle differential device according to claim 5, wherein cross sections of the oil intake holes orthogonal to the axes of the oil intake holes are each formed in a circular shape.

* * * * *

UNITED STATES PATENT AND TRADEMARK OFFICE
CERTIFICATE OF CORRECTION

PATENT NO.          : 9,677,664 B2
APPLICATION NO.     : 15/085296
DATED               : June 13, 2017
INVENTOR(S)         : Hiroyuki Mori Page 1 of 1

It is certified that error appears in the above-identified patent and that said Letters Patent is hereby corrected as shown below:

Item (73) Assignee:
Please correct "Semitsu" to -- Seimitsu --

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*